(12) United States Patent
Urakawa

(10) Patent No.: US 8,411,543 B2
(45) Date of Patent: Apr. 2, 2013

(54) RECORDING APPARATUS AND CONTROL METHOD

(75) Inventor: Yoshiyuki Urakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/252,505

(22) Filed: Oct. 4, 2011

(65) Prior Publication Data

US 2012/0092976 A1    Apr. 19, 2012

(30) Foreign Application Priority Data

Oct. 19, 2010  (JP) ................................. 2010-234657

(51) Int. Cl.
*G11B 7/00* (2006.01)

(52) U.S. Cl. ............... 369/53.28; 369/44.29; 369/53.23; 369/44.35

(58) Field of Classification Search ............... 369/53.23, 369/53.28, 44.29, 44.35, 44.36
See application file for complete search history.

(56) References Cited

U.S. PATENT DOCUMENTS

| | | | | |
|---|---|---|---|---|
| 4,924,455 A * | 5/1990 | Fujiie et al. | ............... | 369/44.21 |
| 6,473,373 B1 * | 10/2002 | Soma et al. | ............... | 369/44.29 |
| 2001/0004304 A1 * | 6/2001 | Sano et al. | ............... | 360/77.03 |
| 2002/0001265 A1 * | 1/2002 | Tateishi et al. | ............. | 369/47.26 |
| 2002/0110057 A1 * | 8/2002 | Kadlec et al. | ............. | 369/44.29 |
| 2003/0053393 A1 * | 3/2003 | Shimano et al. | ......... | 369/112.02 |
| 2007/0104050 A1 * | 5/2007 | Ueda | ........................... | 369/44.35 |
| 2008/0186840 A1 | 8/2008 | Uchiyama et al. | | |
| 2008/0205257 A1 | 8/2008 | Yamatsu et al. | | |

FOREIGN PATENT DOCUMENTS

| | | |
|---|---|---|
| JP | 2008-135144 A | 6/2008 |
| JP | 2008-176902 A | 7/2008 |

* cited by examiner

*Primary Examiner* — Thomas Alunkal
(74) *Attorney, Agent, or Firm* — Wolf, Greenfield & Sacks, P.C.

(57) ABSTRACT

A recording apparatus including: a light-illuminating/receiving-unit illuminating an optical-disc-recording-medium through a common object-lens with recording-light and ATS-light and receiving reflected-ATS-light; a rotation-driving-unit driving rotation of the medium; a tracking-mechanism driving the lens in a tracking-direction parallel to the radial direction; a tracking-error-signal-generation-unit generating a tracking-error-signal; and a tracking-servo-controller performing tracking-servo-control on the lens based on the tracking-error-signal, wherein the tracking-servo-controller includes: a servo-calculation-unit based on the tracking-error-signal in a feedback-loop as a tracking-servo-loop; and a feed-forward-controller calculating an estimated control-target-value of the tracking-servo-control based on an estimated illumination-spot-position value of the ATS-light obtained in a first-filter-process emulating a transfer-characteristic of the tracking-mechanism on an output of the servo-calculation-unit and a distance between the illumination-spot-positions and applies a control-signal generated in a second-filter-process on the estimated value for suppressing a transfer-characteristic-gain of the tracking-servo-loop to 0 dB or less in the entire band to the tracking-servo-loop.

5 Claims, 21 Drawing Sheets

FREQUENCY (red/sec)

FREQUENCY (red/sec)

RECORDING APPARATUS AND CONTROL METHOD

CROSS-REFERENCES TO RELATED APPLICATIONS

This application claims priority to Japanese Patent Application No. JP 2010-234657 filed on Oct. 19, 2010, the entire contents of which are hereby incorporated by reference.

BACKGROUND

The present disclosure relates to a recording apparatus which performs recording with respect to an optical disc recording medium using a so-called adjacent track servo and a control method of the recording apparatus.

As an optical disc recording medium (optical disc) which performs signal recording/reproduction by light illumination, for example, a CD (Compact Disc), a DVD (Digital Versatile Disc), a BD (Blu-ray Disc: registered trade mark), or the like has become widespread.

With respect to the optical disc which will be used as a next generation optical disc which is current widespread, such as the CD, the DVD, the BD, or the like, the present inventor first proposed a so-called bulk recording type optical disc as disclosed in Japanese Unexamined Patent Application Publication Nos. 2008-135144 and 2008-176902.

Herein, the bulk recording is a technique for implementing a large recording capacity by performing laser light illumination on a light recording medium (a bulk type recording medium 100), which includes at least a cover layer 101 and a bulk layer (a recording layer) 102, for example, as illustrated in FIG. 13, while sequentially changing the focus position so as to perform multi-layer recording in the bulk layer 102.

With respect to the bulk recording, Japanese Unexamined Patent Application Publication No. 2008-135144 discloses a recording technique which is a so-called micro-hologram scheme.

In the micro-hologram scheme, a so-called hologram recording material is used as a recording material of the bulk layer 102. For example, a photopolymerization type photopolymer or the like is used as the hologram recording material.

The micro-hologram scheme is mainly classified into a positive type micro-hologram scheme and a negative type micro-hologram scheme.

The positive type micro-hologram scheme is a method where a fine interference fringe (hologram) is formed by focusing two opposite light fluxes (light flux A and light flux B) at the same position, and the interference fringe is used as a recording mark.

In addition, as an opposite idea of the positive type micro-hologram scheme, the negative type micro-hologram scheme is a method where an interference fringe which is formed in advance is removed by laser light illumination, and the removed portion is used as a recording mark. More specifically, in the negative type micro-hologram scheme, before the recording operation is performed, an initialization process for forming the interference fringe on the bulk layer 102 in advance is performed. In other words, the illumination of light fluxes C and D as parallel light is performed in the opposite direction, so that the interference fringe is formed on the entire bulk layer 102. Next, after the interference fringe is formed in advance by the initialization process, the information recording is performed through the formation of the erasing mark. More specifically, the laser light illumination according to the to-be-recorded information is performed in the state where focus is aligned at an arbitrary layer position, so that the information recording by the erasing mark is performed.

In addition, as a bulk recording method different from the micro-hologram scheme, the present inventor also proposed a recording method for forming a void (empty hole, empty pore) as a recording mark, for example, as disclosed in Japanese Unexamined Patent Application Publication No. 2008-176902.

The void recording scheme is a method where the empty hole is recorded in the bulk layer 102 by performing relatively high power laser light illumination on a bulk layer 102 which is configured from a recording material, for example, a photopolymerization type photopolymer, or the like. As disclosed in Japanese Unexamined Patent Application Publication No. 2008-176902, the refractive index of the empty hole portion formed in this manner becomes different from those of other portions in the bulk layer 102, so that the light reflective index of the boundary portion may be increased. Therefore, the empty hole portion functions as a recording mark, so that the information recording is implemented through the formation of the empty hole mark.

In the void recording scheme, since a hologram is not formed, if the light illumination from one side is performed with respect to the recording, the void recording scheme may be considered ineffective. In other words, unlike the case of the positive type micro-hologram scheme, it is not necessary to form the recording mark by focusing the two light fluxes at the same position.

In addition, in comparison with the negative type micro-hologram scheme, there is an advantage in that the initialization process is unnecessary.

In addition, Japanese Unexamined Patent Application Publication No. 2008-176902 discloses an example where the precure light illumination before the recording is performed in the performing of the void recording. However, although the precure light illumination is omitted, the void recording may be performed.

Although the aforementioned various types of recording methods are proposed with respect to the bulk recording type (simply, also referred to as a bulk type) light recording medium, the recording layer (the bulk layer) of the bulk type optical recording medium does not explicitly have a multi-layered structure in the sense that, for example, a plurality of reflective films are formed. In other words, the bulk layer 102 does not include a reflective film and a guiding groove of each recording layer, which are included in a general multi-layered disc.

Therefore, in the state of the structure of the bulk type recording medium 100 illustrated in FIG. 13, the focus servo or the tracking servo may not be performed during the recording period where the mark is not yet formed.

Therefore, in actual cases, a reflection surface (a reference surface Ref) as a reference, which includes guiding grooves illustrated in FIG. 14 is configured to be disposed in the bulk type recording medium 100.

More specifically, the guiding grooves (position guides) such as pits or grooves are formed on the lower surface side of the cover layer 101, and a selective reflection film 103 is formed thereon. In addition, the bulk layer 102 is laminated through an adhesive material, for example, a UV cured resin or the like as an intermediate layer 104 in the figure with respect to the lower surface side of the cover layer 102, where the selective reflection film 103 is formed in this manner.

In addition, after the medium structure is formed, the bulk type recording medium 100 is illuminated with servo laser light as position control laser light separately from mark recording laser light (the recording laser light) as illustrated in FIG. 15.

As illustrated in the figure, the bulk type recording medium 100 is illuminated with the recording laser light and the servo laser light through a common object lens.

At this time, if the servo laser light reaches the bulk layer 102, the servo laser light may have a negative influence on the mark recording in the bulk layer 102. Therefore, in the bulk recording scheme of the related art, laser light having a wavelength band different from that of the recording laser light is used as the servo laser light, and a selective reflection film 103 having a wavelength selectivity where the servo laser light is reflected and the recording laser light is transmitted is disposed as the reflective film which is formed on the guiding groove formation surface (the reference surface Ref).

Under the conditions described hereinbefore, operations during the mark recording period with respect to the bulk type recording medium 100 are described with reference to FIG. 15.

First, when the multi-layer recording is performed on the bulk layer 102 where guiding grooves or a reflective film is not formed, which position is the layer position where the marks are recorded in the depth direction of the bulk layer 102 is set in advance. This figure exemplifies the case where a total of five information recording layer positions L including a first information recording layer position L1 to a fifth information recording layer position L5 are set as the layer positions (mark formation layer positions: also referred to as information recording layer positions) where marks are formed in the bulk layer 102. As illustrated in the figure, the first information recording layer position L1 is set as a position which is separated by a first offset of-L1 in the focus direction (the depth direction) from the selective reflection film 103 (the reference surface Ref) where the guiding grooves are formed. In addition, the second information recording layer position L2, the third information recording layer position L3, the fourth information recording layer position L4, and the fifth information recording layer position L5 are set as positions which are separated by a second offset of-L2, a third offset of-L3, a fourth offset of-L4, and a fifth offset of-L5 from the reference surface Ref, respectively.

During the recording period when the marks are not yet formed, the focus servo and the tracking servo may not be performed on each layer position L as a target in the bulk layer 102 based on the reflected light of the recording laser light. Therefore, the focus servo control and the tracking servo control of the object lens during the recording period is performed so that the spot position of the servo laser light tracks the guiding groove on the reference surface Ref based on the reflected light of the servo laser light as the position control light.

However, the recording laser light necessarily reaches the bulk layer 102 which is formed on the lower surface side from the selective reflection film 103 in order to perform the mark recording. Therefore, in an optical system of this case, a focus mechanism for independently adjusting the focus position of the recording laser light is installed separately from the focus mechanism for the object lens.

Herein, an example of an internal configuration of a recording apparatus for the bulk type recording medium 100 including the mechanism for independently adjusting the focus position of the recording laser light is illustrated in FIG. 16.

In FIG. 16, a first laser diode 111 indicated by LD1 in this figure is a light source of the recording laser light; and a second laser diode 119 indicated by LD2 is a light source of the servo laser light. As understood from the above description, the first laser diode 111 and the second laser diode 119 are configured so as to emit laser light having different wavelength bands.

As illustrated in the figure, the recording laser light emitted from the first laser diode 111 is incident through the collimation lens 112 on a focus mechanism which is constructed with a fixed lens 113, a movable lens 114, and a lens driving unit 115. The movable lens 114 is driven in the direction parallel to the optical axis of the recording laser light by the lens driving unit 115, so that the collimation state (converging/parallel/diverging state) of the recording laser light which is incident on the object lens 117 in this figure is changed. Accordingly, the focus position of the recording laser light may be adjusted independently of a change of the focus position according to the driving of the object lens 117.

In addition, in this sense, the focus mechanism is also referred to as a recording light independent focus mechanism.

The recording laser light passing through the recording light independent focus mechanism is incident on a dichroic mirror 116 which transmits the light having the same wavelength band as that of the recording laser light and reflects the light having the other wavelength bands.

As illustrated in the figure, the bulk type recording medium 100 is illuminated through the object lens 117 with the recording laser light transmitting through the dichroic mirror 116. The object lens 117 is held so that the displacement thereof is performed in the focus direction and the tracking direction by a two-axis actuator 118.

In addition, the servo laser light emitted from the second laser diode 119 passes through the collimation lens 120, and after that, the servo laser light transmits through the beam splitter 121 to be incident on the aforementioned dichroic mirror 116. The servo laser light is reflected on the dichroic mirror 117 so that the optical axis thereof is coincident with the optical axis of the recording laser light transmitting through the dichroic mirror 116, so that the servo laser light is incident on the object lens 117.

The two-axis actuator 118 is driven by the focus servo control according to the later-described servo circuit 125, so that the servo laser light which is incident on the object lens 117 is focused on the selective reflection film 103 (the reference surface Ref) of the bulk type recording medium 100. In addition, at the same time, the two-axis actuator 118 is driven by the tracking servo control according to the servo circuit 125, so that the tracking direction position of the servo laser light tracks the guiding grooves formed on the selective reflection film 103.

The reflected light of the servo laser light from the selective reflection film 103 passes through the object lens 117 and is reflected on the dichroic mirror 116, and after that, the reflected light of the servo laser light is reflected on the beam splitter 121. The reflected light of the servo laser light which is reflected on the beam splitter 121 is collected through a collecting lens 122 on a detection surface of a photodetector 123.

A matrix circuit 124 generates a focus error signal and a tracking error signal based on a light-receiving signal from the photodetector 123 and supplies the error signals to the servo circuit 125.

The servo circuit 125 generates a focus servo signal and a tracking servo signal from the error signals. The aforementioned two-axis actuator 118 is driven based on the focus servo signal and the tracking error signal, so that the focus servo control and the tracking servo control of the object lens 117 are implemented.

Herein, when the mark recording is performed on the necessary information recording layer position L as a target among the information recording layer positions L which are set in advance with respect to the bulk type recording medium 100, the driving of the lens driving unit 115 is controlled, so that the focus position of the recording laser light is changed by the amount corresponding to the offset of which corresponds to the selected information recording layer position L.

More specifically, the control of setting the information recording position is performed, for example, by a controller 126 which performs the overall control of the recording apparatus. In other words, the driving of the lens driving unit 115 is controlled based on the offset amount of-Lx, which is set in advance according to the information recording layer position Lx as a target, by the controller 126, so that the information recording position (the focus position) of the recording laser light is caused to be aligned with the information recording layer position Lx as the aforementioned target.

In addition, as described above, the tracking servo of the recording laser light during the recording period is automatically performed by causing the servo circuit 125 to perform the tracking servo control of the object lens 117 based on the reflected light of the servo laser light. More specifically, the spot position of the recording laser light in the tracking direction is controlled so that the spot position is aligned just below the guiding groove formed on the reference surface Ref.

In addition, when the reproducing is performed with respect to the bulk type recording medium 100 where the mark recording is already performed, similarly to the recording period, the position of the object lens 117 is not necessarily controlled based on the reflected light of the servo laser light from the reference surface Ref. In other words, during the reproduction period, the reproducing laser light illumination is performed on the mark sequence which is formed at the information recording layer position L as a the reproduction target, so that the focus servo control and the tracking servo control of the object lens 117 may be performed based on the reflected light of the reproducing laser light.

As described above, in the bulk recording scheme, it is configured so that the bulk type recording medium 100 is illuminated with the recording laser light as the mark recording light and the servo laser light as the position control light through the common object lens 117 (by combining the recording laser light and the servo laser light on the same optical axis). In addition, the focus servo control and the tracking servo control of the object lens 117 are performed based on the reflected light of the servo laser light, so that it is possible to perform the focus servo and the tracking servo of the recording laser light although the guiding groove or the reflection surface where the guiding groove is formed is not formed in the bulk layer 102.

However, in the case of employing the servo control method described above, there may be a problem in that a shift of the information recording position in the tracking direction occurs due to the lens shift of the object lens 117 which is caused by eccentricity of the bulk type recording medium 100, backlash of the slide mechanism of the optical pickup, or the like.

As described for confirmation, the lens shift according to the backlash of the slide mechanism denotes that, as the position of the optical pickup during the slide servo control is rapidly (instantaneously) changed due to the occurrence of the mechanical backlash of the slide mechanism, the position of the object lens 117 during the tracking servo control is shifted in order to absorb the change thereof.

FIGS. 17A to 17C are diagrams illustrating the principle of the occurrence of the shift of the information recording position according to the lens shift described above.

Among FIGS. 17A to 17C, FIG. 17A illustrates an ideal state where the eccentricity of the bulk type recording medium 100 or the backlash of the slide mechanism does not exist and the lens shift of the object lens 117 does not occur; FIG. 17B illustrates the case where the lens shift in the left direction on the page (referred to as an outer circumference direction) occurs (referred to as an eccentricity in the + direction); and FIG. 17C illustrates the case where the lens shift in the right direction on the page (referred to as an inner circumference direction) occurs (referred to as an eccentricity in the − direction).

First, in these figures, the central axis c is a central axis set for design of an optical system, and in the ideal state illustrated in FIG. 17A, the center of the object lens 117 is coincident with the central axis c.

On the contrary, in the case where the lens shift in the + direction occurs as illustrated in FIG. 17B, the center of the object lens 117 is shifted from the central axis c of the optical system in the + direction.

At this time, since the servo laser light (the patterned light rays in these figures) as parallel light is incident on the object lens 117, although the shift from the central axis c of the object lens 117 occurs as described above, the position change of the focus position in the tracking direction does not occur. On the contrary, since the recording laser light (the outlined light rays in these figures) as non-parallel light is incident on the object lens 117 so as to be focused at the necessary information recording layer position L in the bulk layer 102 of the lower surface side from the reference surface Ref as described above, with respect to the shift of the object lens 117 in the + direction described above, the focus position (the information recording position) of the recording laser light is changed by the distance corresponding to the lens shift amount in the + direction (shift amount+d in the figure) as illustrated in the figure.

In addition, in the case where the lens shift in the − direction occurs as illustrated in FIG. 17C, the information recording position of the recording laser light is changed by a distance corresponding to the lens shift amount in the − direction (shift amount-d in the figure) as illustrated in the figure.

The recording apparatus for the bulk type recording medium 100 described with reference to FIG. 16 has the following configuration.

The illumination of the recording laser light and the servo laser light is performed through the common object lens 117.

The focus servo control of the object lens 117 is performed so that the servo laser light is focused on the reference surface Ref of the bulk type recording medium 100.

The focus position (the information recording position) of the recording laser light is adjusted by changing the collimation state of the recording laser light which is incident on the object lens 117.

The tracking servo control of the object lens 117 is performed so that the focus position of the servo laser light tracks the guiding groove formed on the reference surface Ref.

In this configuration, there may be a problem in that the shift of the information recording position of the recording laser light occurs in the tracking direction due to the eccentricity of the disc, the backlash of the slide mechanism, or the like.

At this time, there is also a problem in that the information recording positions may be overlapped between the adjacent guiding grooves according to the size of the eccentricity or the like or the setting of the track pitch (the guiding groove formation interval). Therefore, a recording signal may not be correctly reproduced.

In addition, in the above description, although the lens shift of the object lens 117 is described as a main cause of the shift of the information recording position, the shift of the information recording position may also occur in the same manner due to the disc tilt.

As one measure for avoiding the aforementioned problems of the shift of the information recording position, the track pitch is widened so as be equal to or larger than the change in the information recording position.

However, in this measure, since the maximum amount of the lens shift or the like is not definitely determined, there may be a problem where it is not determined to what extent the track pitch is to be widened. In addition, above all, there may be a problem in that the recording capacity is decreased due to the widening of the track pitch.

In addition, as another measure for avoiding the shift of the information recording position, the system is configured so that the disc is non-detachable.

Herein, as a cause of the eccentricity, there is an error between an inner diameter of a disc and a clamp diameter of a spindle motor. In the manufacturing process, it is difficult to completely remove the error therebetween so as to be zero, so that the eccentricity is inevitable. In addition, even though the error therebetween may be removed so as to be zero, since the recording signal center of the reference surface of the disc may not be coincident with the spindle shaft center of the recording apparatus, the eccentricity also occurs on the surface. Therefore, if the system is configured so that the disc is non-detachable, the influence of the eccentricity is the same, so that it is possible to avoid the problem of recording positions overlapping. Accordingly, the track pitch may be reduced, so that it is possible to increase the recording capacity by the amount corresponding to the reduction of the track pitch.

However, naturally, since the replacement of the disc may not be performed in this method, for example, when the disc is defective, the replacement of only the disc may not be performed. In addition, reading of data recorded in the recording apparatus may not be performed by another recording apparatus. In other words, in this sense, the convenience is lost.

Therefore, as an effective method for avoiding this problem, it is considered to employ the so-called ATS (Adjacent Track Servo) method. Originally, the ATS has been investigated as a self servo track writer in a hard disk drive.

FIG. 18 is a diagram illustrating the ATS.

As illustrated in this figure, in the ATS, a recording spot Srec and an adjacent track servo spot Sats are configured to be formed on the recording medium. The spot Srec and the spot Sats are formed by illuminating the recording medium through the common object lens with light beams as respective light sources. At this time, the distance between the spots is set to be fixed.

In the ATS, the recording spot Srec is set as a preceding spot (that is, in the case where the recording proceeding direction is inner circumference outer circumference, the outer circumference side spot), and the adjacent track servo spot Sats is set as the following spot which is in the mark sequence formed by the recording spot Srec. The tracking servo is applied by the adjacent track servo spot Sats. As a result, the tracking servo control of the object lens is performed so that the adjacent track servo spot Sats tracks the one preceding track where the recording spot Srec is formed.

According to the ATS, since the track pitch as the distance between the spots S is constant, it is possible to prevent the occurrence of the problem where the tracks are overlapped (the information recording positions are overlapped) due to the influence of the eccentricity or the like. In other words, as described above, it is not necessary to increase the track pitch marginally or to configure a system where the disc may not be mounted by considering the shift of the information recording position caused by the eccentricity or the like.

SUMMARY

However, in the ATS, in the case of performing the same method as the tracking servo method where the tracking servo using the adjacent track servo spot Sats is performed in the related art, it is determined that, as the rotation is repeated, the tracking error component is gradually increased and diverges.

Hereinafter, this point is described.

FIG. 19 illustrates the ATS control system by using transfer function blocks.

In FIG. 19, a transfer function block indicated by K(z) denotes a discrete system based transfer function of a servo operator (servo filter) as a controller in the tracking servo system, and a transfer function block indicated by P(z) denotes a discrete system based a transfer function of an actuator which drives the object lens.

In addition, in the figure, r indicates a control target position, and e indicates a tracking error signal. In addition, u indicates an output (corresponding to the tracking drive signal) of the controller, and $y_s$ indicates a position of the adjacent track servo spot Sats.

In addition, $d_{r-a}$ indicates a distance between the recording spot Srec and the adjacent track servo spot Sats.

As illustrated, a difference between the position $y_s$ of the adjacent track servo spot Sats and the target position r becomes the error signal e. Similarly to a general tracking servo control system, in the servo system of this case, the controller (K(z)) is operated so that the error signal e becomes zero.

Herein, as understood from the above description of FIG. 18, in the ATS, the position of the recording spot Srec at the time of recording one preceding track becomes the target position r at the time of recording the current recording target track. In FIG. 19, under this premise, the target position r is expressed by the delay time factor $z^{-k}$ corresponding to the time of one disc rotation and the distance $d_{r-a}$. More specifically, the target position r is expressed by causing the position $y_r$ of the recording spot Srec, which is expressed by adding the distance $d_{r-a}$ to the position $y_s$ of the adjacent track servo spot Sats, to pass through the delay time factor $z^{-k}$. In other words, the position of the recording spot Srec at the time corresponding to one disc rotation previous is the target position r.

The transfer characteristic from the target position r to the position $y_s$ in the control system illustrated in FIG. 19 generally becomes the characteristics illustrated in FIGS. 20A and 20B.

In FIGS. 20A and 20B, FIG. 20A illustrates a frequency-amplitude characteristic, and FIG. 20B illustrates a frequency-phase characteristic. However, as understood with reference to FIGS. 20A and 20B, in the transfer characteristic from the target position r to the position $y_s$ (that is, the transfer characteristic of the ATS control system), the transfer characteristic gain in the band in the vicinity of the servo band is higher than 0 dB. In addition, with respect to the phase, there is a tendency for delay to occur in the vicinity of the servo band.

In this manner, due to the characteristic that the gain in the servo band is higher than 0 dB, the component in the servo band is amplified every rotation of the disc, so that the position $y_s$ of the adjacent track servo spot Sats diverges with time as illustrated in FIG. 21.

Due to this point, in the ATS of the related art, it is very difficult to stably perform the tracking servo control.

It is desirable to provide a recording apparatus configured hereinafter.

In other words, the recording apparatus includes a light illuminating/receiving unit which is configured to cause an optical disc recording medium to be illuminated through a common object lens with recording light and ATS light for the adjacent track servo and to receive reflected light of the ATS light from the optical disc recording medium.

In addition, the recording apparatus includes a rotation driving unit which drives the optical disc recording medium to be rotated.

In addition, the recording apparatus includes a tracking mechanism which drives the object lens in a tracking direction which is a direction parallel to a radius direction of the optical disc recording medium.

In addition, the recording apparatus includes a tracking error signal generation unit which generates a tracking error signal indicating an error of an illumination spot position of the ATS light with respect to a mark sequence recorded on the optical disc recording medium based on a light-receiving signal of the ATS light obtained by the light illuminating/receiving unit.

In addition, the recording apparatus includes a tracking servo controller which performs tracking servo control on the object lens by driving a tracking mechanism based on the tracking error signal.

In addition, the tracking servo controller is configured to include: a servo calculation unit which performs servo calculation based on the tracking error signal in a feedback loop as a tracking servo loop; and a feed forward controller which calculates an estimated value of a control target value of the tracking servo control of the tracking servo controller based on an estimated value of the illumination spot position of the ATS light obtained by performing a first filter process emulating a transfer characteristic of the tracking mechanism on an output signal of the servo calculation unit and a value of a distance between the illumination spot position of the recording light and the illumination spot position of the ATS light and which applies a control signal, which is generated by performing a second filter process for suppressing a transfer characteristic gain of the tracking servo loop to 0 dB (decibel) or lower over the entire frequency band with respect to the estimated value, to the tracking servo loop.

According to the present disclosure, the transfer characteristic gain of the tracking servo loop constituting the ATS control system may be suppressed to be equal to or less than 0 dB over the entire frequency band. In other words, unlike the ATS control system in the related art, it is possible to solve the problem where the transfer characteristic gain in the servo band is higher than 0 dB.

According to the present disclosure, it is possible to improve the characteristic of the ATS control system in the related art in that the transfer characteristic gain in the servo band is higher than 0 dB. As a result, unlike the ATS control system in the related art, it is possible to prevent the problem where the tracking error signal is amplified and diverges with time.

Therefore, it is possible to stabilize the ATS.

DETAILED DESCRIPTION OF EMBODIMENTS

Hereinafter, embodiments for implementing the present disclosure (hereinafter, referred to as embodiments) will be described.

In addition, the description is made in the following order.
<1. First Embodiment>
[1-1. Example of Optical Disc Recording Medium as Recording Target]

[1-2. Internal Configuration of Recording Apparatus According to Embodiment]

[1-3. Servo Control Method According to First Embodiment]

[1-4. Example of Configuration of Servo Circuit]

<2. Second Embodiment>

[2-1. Servo Control Method According to Second Embodiment]

[2-2. Example of Configuration of Servo Circuit]

<3. Modified Example>

<1. First Embodiment>

[1-1. Example of Optical Disc Recording Medium as Recording Target]

Figure 1:
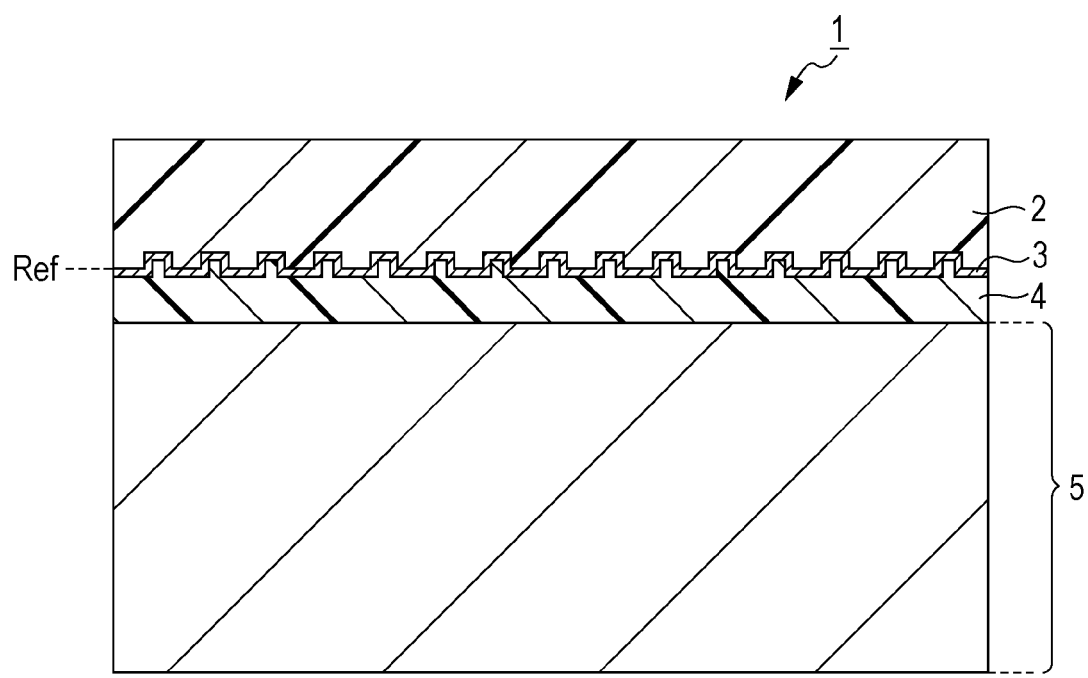
FIG. 1 is a diagram illustrating a cross-sectional structure of an optical disc recording medium as a recording target according to an embodiment.

FIG. 1 illustrates a cross-sectional structure diagram of an optical disc recording medium as a recording target of a recording apparatus according to an embodiment.

In the embodiment, the optical disc recording medium as the recording target is a so-called bulk recording type optical disc recording medium, which is hereinafter referred to as a bulk type recording medium 1.

In the state where the bulk type recording medium 1 as the optical disc recording medium is driven to rotate by the recording apparatus, laser light illumination is performed on the bulk type recording medium 1, so that mark recording (information recording) is performed.

In addition, the optical disc recording medium collectively denotes disc-shaped recording media where information is recorded (and reproduced) through light illumination.

As illustrated in FIG. 1, in the bulk type recording medium 1, a cover layer 2, a selective reflection film 3, an intermediate layer 4, and a bulk layer 5 are formed in this order from the upper layer side.

Herein, in the specification, the "upper layer side" indicates the upper layer side when the surface, on which the laser light of the later-described recording apparatus (recording apparatus 10) according to the embodiment is incident, is set as the top surface.

In addition, in the specification, although the term "depth direction" is used, the "depth direction" indicates the direction (that is, the direction parallel to the incidence direction of the laser light from the recording apparatus side: the focus direction) which is coincident with the up/down direction (the vertical direction) according to the definition of the aforementioned "upper layer side".

In the bulk type recording medium 1, the cover layer 2 is constructed with a resin, for example, polycarbonate, acryl, or the like, and as illustrated in the figure, the position guide for guiding the recording position is formed on the lower surface side thereof.

In this case, the guiding groove formed with a continuous groove (groove) or a pit sequence is formed as the position guide, so that a cross-sectional shape of concave convex is formed as illustrated in the figure. Herein, for example, in the case where the guiding groove is formed with the pit sequence, the position information (absolute position information: indicating rotation angle information and radial position information) is recorded by the combination of the lengths of pits and lands. Alternatively, in the case where the guiding groove is formed with the groove, the groove is formed so as to be periodically meandered (wobbled), so that the position information recording is performed according to the period information of the meandering.

The cover layer 2 is formed through injection molding or the like using a stamper where the guiding groove (concave-convex shaped pattern) is formed.

In addition, the selective reflection film 3 is formed on the lower surface side of the cover layer 2 where the guiding groove is formed.

Herein, as described above, in the bulk recording scheme, in separation with the recording light (recording laser light) for performing the mark recording on the bulk layer 5 as the recording layer, the illumination of the servo light (position control light, sometimes referred to as servo laser light) for obtaining the tracking error signal or the focus error signal based on the guiding groove described above is separately performed.

At this time, if the servo light reaches the bulk layer 5, the servo light may exert a negative influence on the mark recording in the bulk layer 5. Therefore, the reflective film which reflects the servo light and transmits the recording light is necessary.

In the bulk recording scheme of the related art, the laser light beams having different wavelength bands are used as the recording light and the servo light. Accordingly, a selective reflection film having a wavelength selectivity of reflecting the light in the same wavelength band as that of the servo light and transmitting the light in the other wavelength band is used as the selective reflection film 3.

The bulk layer 5 as the recording layer is laminated (adhered) to the lower layer side of the selective reflection film 3 through the intermediate layer 4 constructed with, for example, an adhesive material such as a UV cured resin.

As a material (recording material) of the bulk layer 5, an appropriately optimal material according to the employed bulk recording scheme, for example, the aforementioned positive type micro-hologram scheme or the aforementioned negative type micro-hologram scheme, the aforementioned void recording scheme, or the like may be employed.

In addition, the mark recording scheme for the optical disc recording medium according to the present disclosure is not particularly limited, but an arbitrary method may be employed within the scope of the bulk recording scheme.

Hereinafter, in the description of this example, the void recording scheme is employed.

Herein, in the bulk type recording medium 1 having the configuration described above, the selective reflection film 3 where the concave-convex cross-sectional shape pattern is applied according to the formation of the aforementioned guiding groove becomes the reflection surface which is used as a reference of the performance of the position control of the recording laser light based on the servo laser light as described later. In this sense, hereinafter, the surface on which the selective reflection film 3 is formed is referred to as a reference surface Ref.

Figure 15:
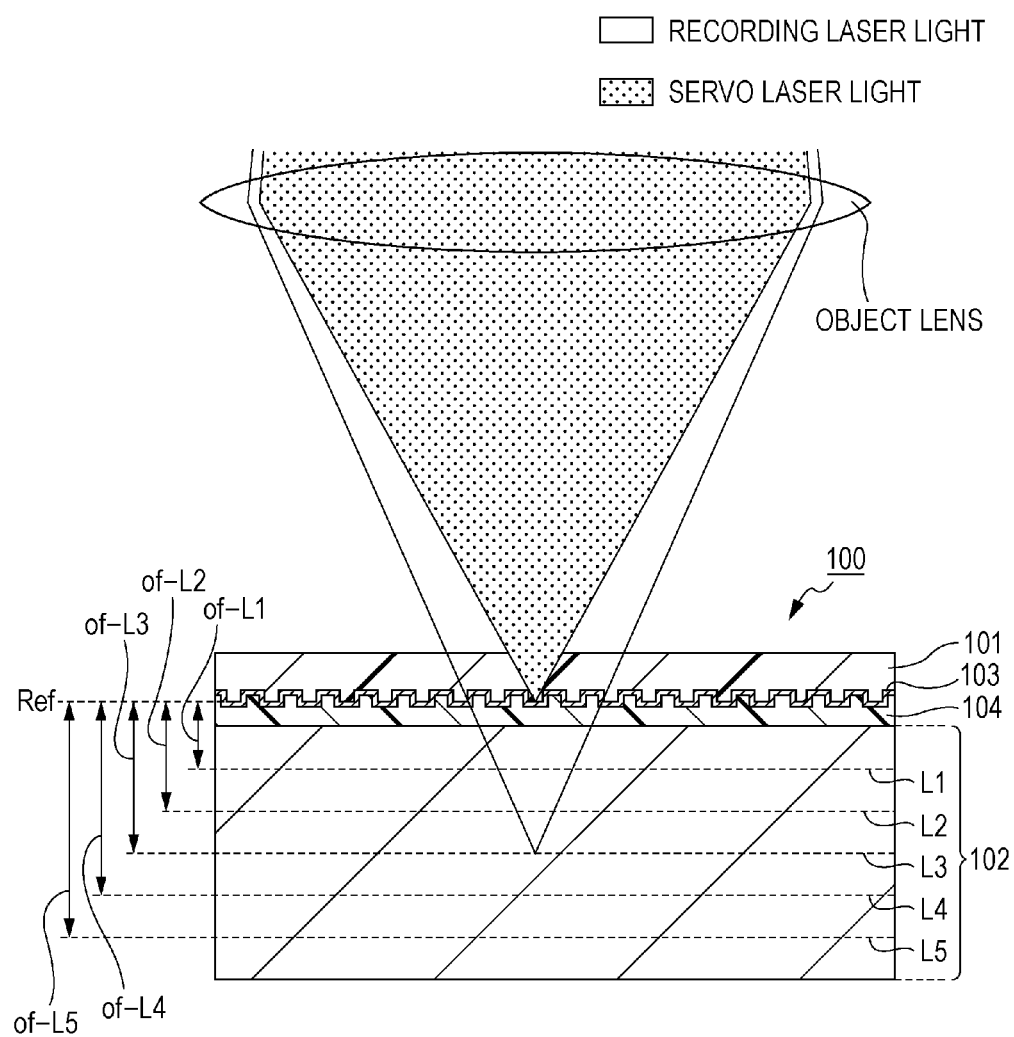
FIG. 15 is a diagram illustrating operations during mark recording period with respect to a bulk type recording medium.

As described above with reference to FIG. 15, in the bulk type optical recording medium, in order to perform the multi-layer recording in the bulk shaped recording layer, the layer positions (information recording layer positions L) where the information recording is to be performed are set in advance. In the bulk type recording medium 1, with respect to the information recording layer positions L, similarly to FIG. 15 described above, a first information recording layer position L, a second information recording layer position L2, a third information recording layer position L3, a fourth information recording layer position L4, and a fifth information recording layer position L5 are set as the positions which are separated by a first offset of-L1, a second offset of-L2, a third offset of-L3, a fourth offset of-L4, and a fifth offset of-L5, respectively, from the reference surface Ref in the depth direction.

The information of the offset of-L of each layer position L from the reference surface Ref is set in the recording apparatus side in advance.

In addition, the number of the information recording layer positions L is not limited to 5.

[1-2. Internal Configuration of Recording Apparatus According to Embodiment]

Figure 2:
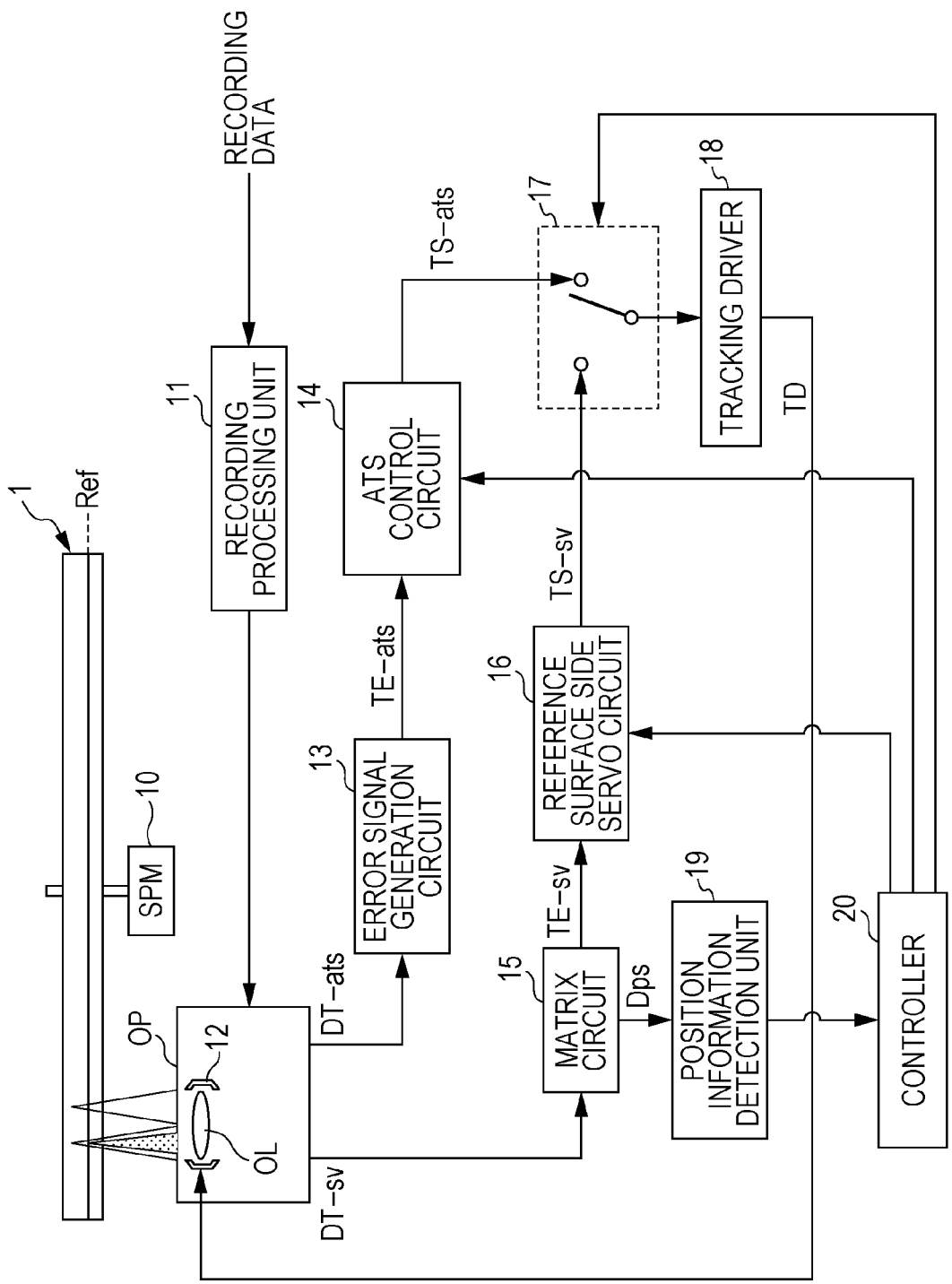
FIG. 2 is a diagram illustrating an internal configuration of a recording apparatus according to an embodiment.

FIG. 2 illustrates an internal configuration of a recording apparatus according to an embodiment where the recording is performed on the bulk type recording medium 1 illustrated in FIG. 1.

Figure 18:
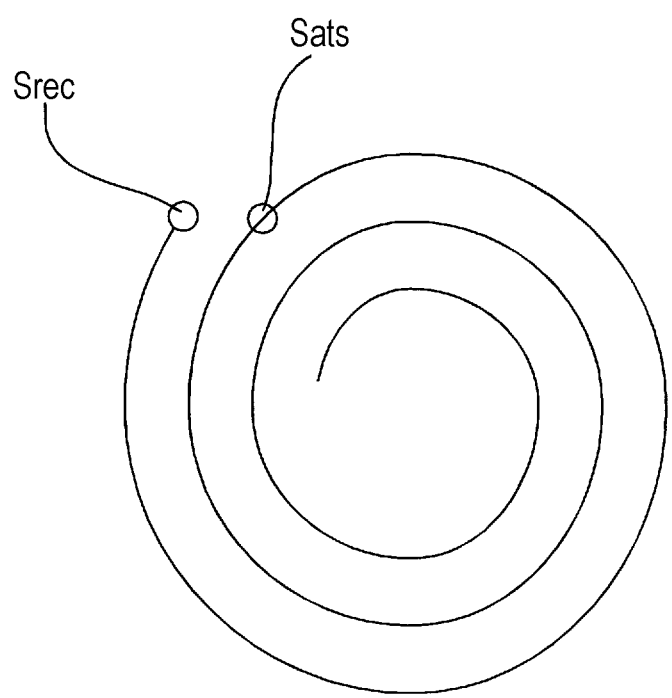
FIG. 18 is a diagram illustrating ATS.

The recording apparatus according to the embodiment is configured so that the tracking servo of the recording light is implemented by ATS (Adjacent Track Servo) as described above in FIG. 18.

Herein, in the recording apparatus according to the embodiment, although the tracking servo control system using the servo laser light is also installed together with the ATS control system, this configuration is provided so that the tracking servo control of the object lens may be performed based on the position guide of the reference surface Ref when the first-time mark recording on an unrecorded bulk layer 5 is performed.

If the tracking servo control system based on the servo laser light is not installed, when the first-time mark recording is performed (in other words, the recording of the first mark sequence is performed) on the bulk layer 5 having neither position guide nor reflection surface where the position guide is not formed, the tracking servo may not be applied and the recording is performed in the state where the object lens (OL) is in a free state (in other words, in the state where the eccentricity component, the external disturbance component, or the like is not cancelled), so that there may be a problem in that an accurate spiral shape may not be formed.

Therefore, when the first-time mark recording is performed, in order to apply the tracking servo using the position guide formed on the reference surface Ref, the tracking servo control system based on the servo laser light is provided.

In addition, although an accurate spiral shape is not formed, according to the following ATS recording, the track pitch becomes constant in the mark sequence which is already recorded, a problem where the recording capacity is deteriorated does not particularly occur. As understood from this description, when the first-time mark recording is performed, the tracking servo control of the object lens based on the servo laser light by using the reference surface Ref described above is not necessarily performed. In other words, the tracking servo control system based on the servo laser light is not necessarily provided.

In addition, in the case where the tracking servo control of the object lens based on the servo laser light is not performed, although the position information recorded on the reference surface Ref is not used, in this case, the radius direction position information is detected by the radius sensor using, for example, a laser scale or the like; and in addition, the rotation angle information may be acquired based on the result of the detection of for example, the rotation angle of the spindle motor 10.

In FIG. 2, the bulk type recording medium 1 mounted on the recording apparatus is set so that the center hole thereof is clamped at a predetermined position of the recording apparatus, so that the bulk type recording medium 1 is maintained in the state where the rotation driving of the spindle motor (SPM) 10 may be performed in this figure.

In addition, the recording apparatus includes the optical pickup OP which causes the bulk type recording medium 1, of which the rotation is driven by the spindle motor 10, to be illuminated through the common object lens OL with the recording laser light, the servo laser light, and the ATS light for forming the beam spot for the adjacent track servo.

In the optical pickup OP, the object lens OL is held so that the displacement thereof is performed in the focus direction and the direction (the tracking direction) parallel to the radius direction of the bulk type recording medium 1 by the two-axis actuator 12.

In addition, a light-receiving unit for receiving the reflected light of the ATS light from the bulk type recording medium 1 is also included in the optical pickup OP, and a light-receiving signal of the light-receiving unit is denoted by "DT-ats" in this figure.

In addition, a light-receiving unit for receiving the reflected light of the servo laser light is also included in the optical pickup OP, and a light-receiving signal of the light-receiving unit is denoted by "DT-sv".

The optical pickup OP of this example is configured so that the recording laser light and the servo laser light are combined on the same optical axis and the bulk type recording medium 1 is illuminated with the combined light. In other words, in the tracking direction, the illumination spot position of the recording laser light and the illumination spot of the servo laser light position are configured so as to be overlapped at the same position (influence of the lens shift or tilt is excluded).

In addition, the optical pickup OP performs the illumination so that the illumination spot position of the ATS light is located to be separated by a predetermined interval from the illumination spot position of the recording/reproduction laser light.

As described above in FIG. 18, since the ATS is disposed so that the recording spot becomes the preceding spot and the spot of the ATS light becomes the following spot, the optical pickup OP is configured to perform the illumination of the ATS light so that the illumination spot of the ATS light is located in the direction opposite to the recording direction with respect to the recording spot as the direction where the recording is performed in the radius direction is referred to as a recording direction.

In addition, as described above, the wavelength band of the recording laser light is different from that of the servo laser light. In this case of the example, the wavelength of the recording laser light is about 405 nm (a so-called blue-violet laser light), and the wavelength of the servo laser light is about 650 nm (red laser light).

Herein, with respect to the recording laser light and the ATS light, a common light source may be used. In this case, the wavelength of the recording laser light is the same as that of the ATS light.

Alternatively, the light source for the recording laser light and the light source for the ATS light may be separately provided. In this case, the wavelength of the ATS light is set to be equal to the wavelength of the recording/reproduction laser light or a wavelength in the vicinity of the wavelength by taking into consideration the wavelength selectivity of the wavelength selection film 3 illustrated in FIG. 1.

In addition, in the case where a common light source is used for the recording/reproduction laser light and the ATS light, the light is generated by splitting the light emitted from the light source into a plurality of the light fluxes by a grating or the like.

In addition, although the description is omitted in the figure, in an actual recording apparatus, a slide driving unit for slidingly driving the optical pickup OP in the tracking direction is installed, the light illumination position on the bulk type recording medium 1 may be changed in a wide range by the driving of the optical pickup OP by the slide driving unit.

In addition, a recording processing unit 11, an error signal generation circuit 13, an ATS control circuit 14, a matrix circuit 15, a reference surface-side servo circuit 16, a selector 17, a tracking driver 18, a position information detection unit 19, and a controller 20 are installed outside the optical pickup OP.

The recording processing unit 11 drives the light source of the recording laser light installed in the optical pickup OP to emits light according to the input recording data and performs the mark recording on the bulk layer 5.

The error signal generation circuit 13 is input with the light-receiving signal DT-ats from the aforementioned light-receiving unit for the ATS light installed in the optical pickup OP. The error signal generation circuit 13 generates the tracking error signal TE-ats indicating the error of the illumination spot position of the ATS light to the recorded mark sequence based on the light-receiving signal DT-ats.

The ATS control circuit 14 generates the tracking servo signal TS-ats for causing the error signal TE-ats to become the predetermined target value (zero) based on the tracking error signal TE-ats generated by the error signal generation circuit 13. As illustrated in the figure, the tracking servo signal TS-ats is applied to the selector 17.

In addition, the internal configuration of the ATS control circuit 14 is described again later.

The matrix circuit 15 is input with the light-receiving signal DT-sv from the aforementioned light-receiving unit for the servo laser light inside the optical pickup OP. The matrix circuit 15 includes a current voltage conversion circuit, a matrix calculation/amplification circuit, and the like to generate signals necessary for the matrix calculation process with respect to the output current of a plurality of the light-receiving devices included in the light-receiving unit.

More specifically, in this case, the matrix circuit 15 generates the position information detection signal Dps for detecting the absolute position information recorded on the reference surface Ref together with the tracking error signal TE-sv indicating the error of the illumination spot position of the servo laser light to the track (groove or pit sequence) on the reference surface Ref.

The position information detection signal Dps generated by the matrix circuit 15 is supplied to the position information detection unit 19. The position information detection unit 19 detects the absolute position information (the radial position information and the rotation angle information) recorded on the reference surface Ref based on the position information detection signal Dps. The detected absolute position information is supplied to the controller 20.

In addition, the tracking error signal TE-sv generated by the matrix circuit 15 is supplied to the reference surface-side servo circuit 16.

The reference surface-side servo circuit 16 generates the tracking servo signal TS-sv for causing the tracking error signal TE-sv to become zero based on the tracking error signal TE-sv and outputs the tracking servo signal TS-sv to the selector 17.

In addition, the reference surface-side servo circuit 16 performs the output of the jump pulse for embodying the track jump operation by setting the tracking servo loop to be off or performs the tracking servo drawing control or the like according to the command of the controller 20.

The selector 17 selects one of the tracking servo signal TS-ats of the ATS control circuit 14 and the tracking servo signal TS-sv of the reference surface-side servo circuit 16 according to the command of the controller 20 and outputs the selected tracking servo signal to the tracking driver 18.

The tracking driver 18 generates the tracking drive signal TD for driving the tracking actuator of, for example, a tracking coil or the like included in the two-axis actuator 12 based on the tracking servo signal TS output from the selector 17 and applies the tracking drive signal TD to the tracking actuator.

In the case where the tracking error signal TE-sv side is selected in the selector 17 by driving the tracking actuator according to the tracking drive signal TD, the tracking servo loop of "the two-axis actuator 12→the matrix circuit 15→the reference surface-side servo circuit 16→the tracking driver 18→the two-axis actuator 12" is formed. In addition, in the case where the tracking error signal TE-ats side is selected, the tracking servo loop of "the two-axis actuator 12→the error signal generation circuit 13→the ATS control circuit 14→the tracking driver 18→the two-axis actuator 12" is formed.

The controller 20 is constructed with, for example, a microcomputer including a CPU (Central Processing Unit) and a memory (storage apparatus) such as a ROM (Read Only Memory) and a RAM (Random Access Memory) and performs controls and processes according to programs stored in, for example, the aforementioned ROM and the like, so that the overall control of the recording apparatus is performed.

More specifically, the controller 20 commands the reference surface-side servo circuit 16 to locate the illumination spot of the servo laser light at a predetermined position on the reference surface Ref. In other words, the controller 20 performs the access command for accessing the predetermined position on the disc.

In addition, the controller 20 of this example also performs switching control with respect to the selector 17.

Herein, the access commanding with respect to the reference surface-side servo circuit 16 or the switching control with respect to the selector 17 is performed when the first-time mark recording on an unrecorded bulk layer 5 is started. More specifically, first, the reference surface-side servo circuit 16 is commanded to access the predetermined recording start position on the disc, so that the operation for causing the illumination spot of the servo laser light to reach the recording start position is performed. Accordingly, the position (tracking direction position) of the illumination spot of the recording laser light is caused to reach the position corresponding to the recording start position. At this time, in the selector 17, the selection state of the tracking servo signal TS-sv side is maintained, so that the tracking servo control state of the object lens OL according to the servo laser light is sustained.

Next, in this state, the mark recording is started. After the start of the mark recording, for example, according to the completion of the recording of one disc rotation, the selector 17 is caused to select the tracking servo signal TS-ats side. As understood by reference to FIG. 18 described above, according to the completion of the recording of at least one disc rotation, since the illumination spot of the ATS light as the following spot is located on the mark sequence of which the recording is completed, the system may smoothly proceed to the ATS by switching the selection state of the selector 17 as described above.

In addition, a specific method of proceeding from the reference surface-side servo to the ATS is not limited to the aforementioned method, but the method described herein is an example.

Figure 16:
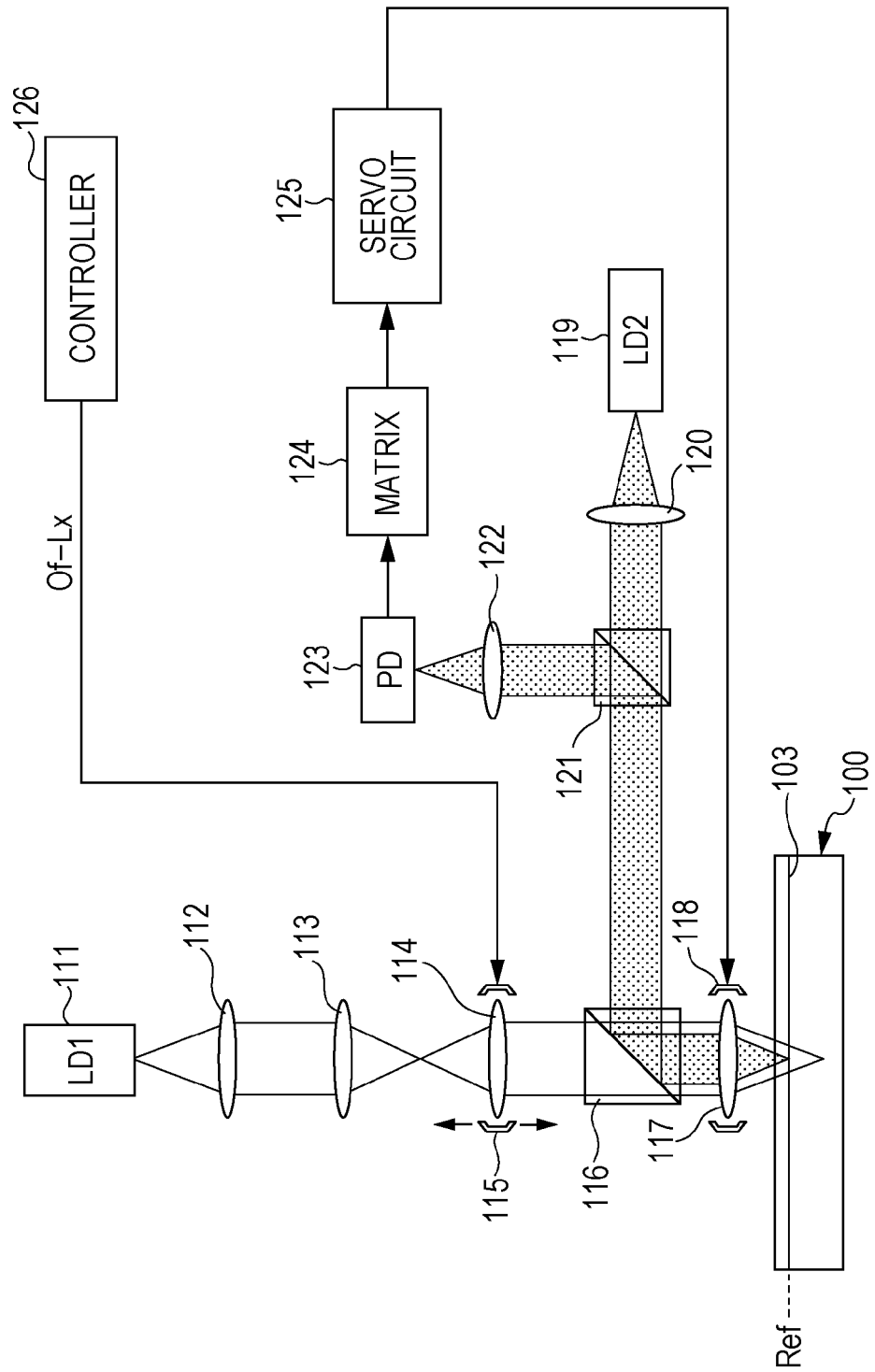
FIG. 16 is a diagram illustrating an internal configuration of a recording apparatus in the related art, which performs recording on a bulk type recording medium.
Figure 17C:
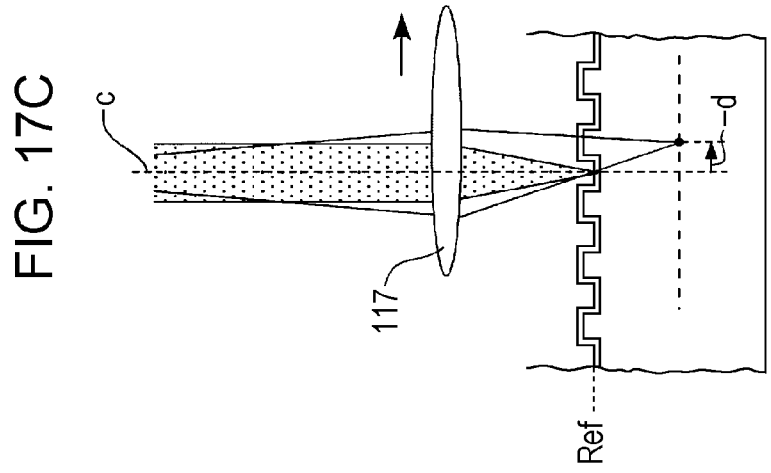
FIGS. 17A to 17C are diagrams illustrating the principle of the occurrence of a shift of an information recording position in the tracking direction due to a lens shift.
Figure 17B:
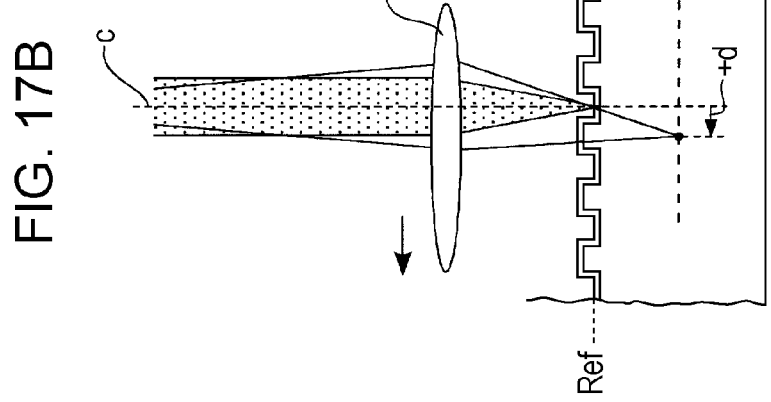
Figure 17A:
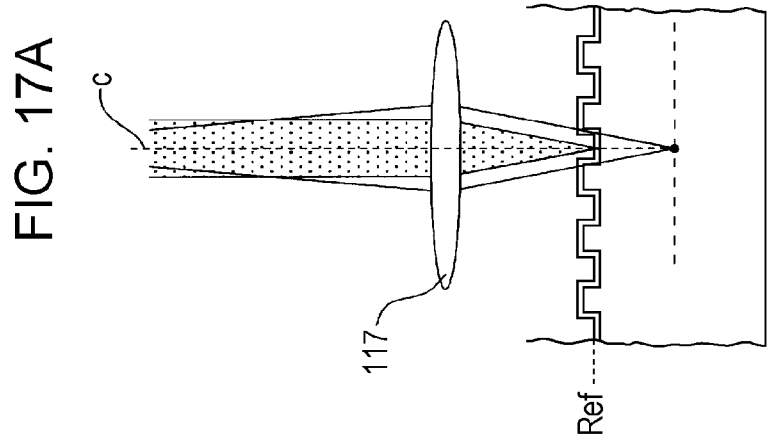

Herein, although the illustration of the configuration of the focus control system is omitted in FIG. 2, even in the case of this example, the same method as that described above in FIG. 16 may be performed with respect to the focus control. In other words, with respect to the focus control of the recording laser light (ATS light), while the focus servo control of the object lens OL is performed so that the servo laser light is focused on the reference surface Ref, the focus control of the recording laser light (ATS light) may be performed by changing the collimation states of the recording laser light and the ATS light incident on the object lens OL by the recording light independent focus mechanism (corresponding to the fixed lens 113, the movable lens 114, and the lens driving unit 115 in FIG. 16) installed in the optical pickup OP.

In this case, the selection of the information recording layer position L in the bulk layer 5 is performed, for example, based on the control of the controller 20. More specifically, the value of the offset of- (referring to FIG. 15) which is set to each information recording layer position L is set in advance in the controller 20, and the controller 20 controls the lens driving unit of the recording light independent focus mechanism to drive the movable lens based on the value of the offset of-Lx corresponding to the information recording layer position Lx which is to be a recording target, so that the focus position of the recording laser light (and the ATS light) is caused to be coincident with the information recording layer position Lx.

[1-3. Servo Control Method According to First Embodiment]

Figure 20A:
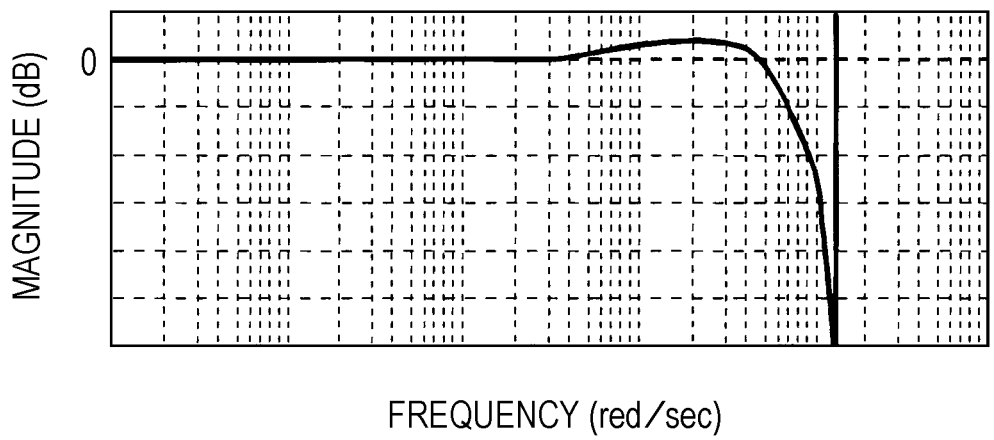
FIGS. 20A and 20B are diagrams illustrating transfer characteristics of the ATS control system in the related art.
Figure 20B:
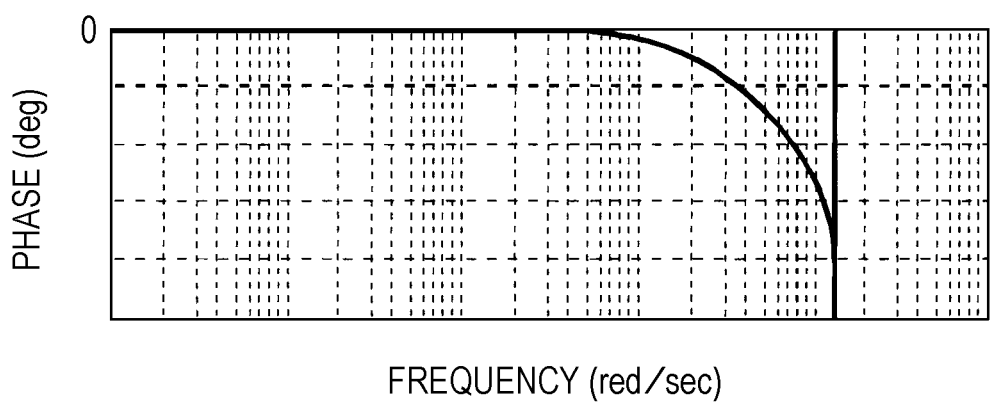
Figure 21:
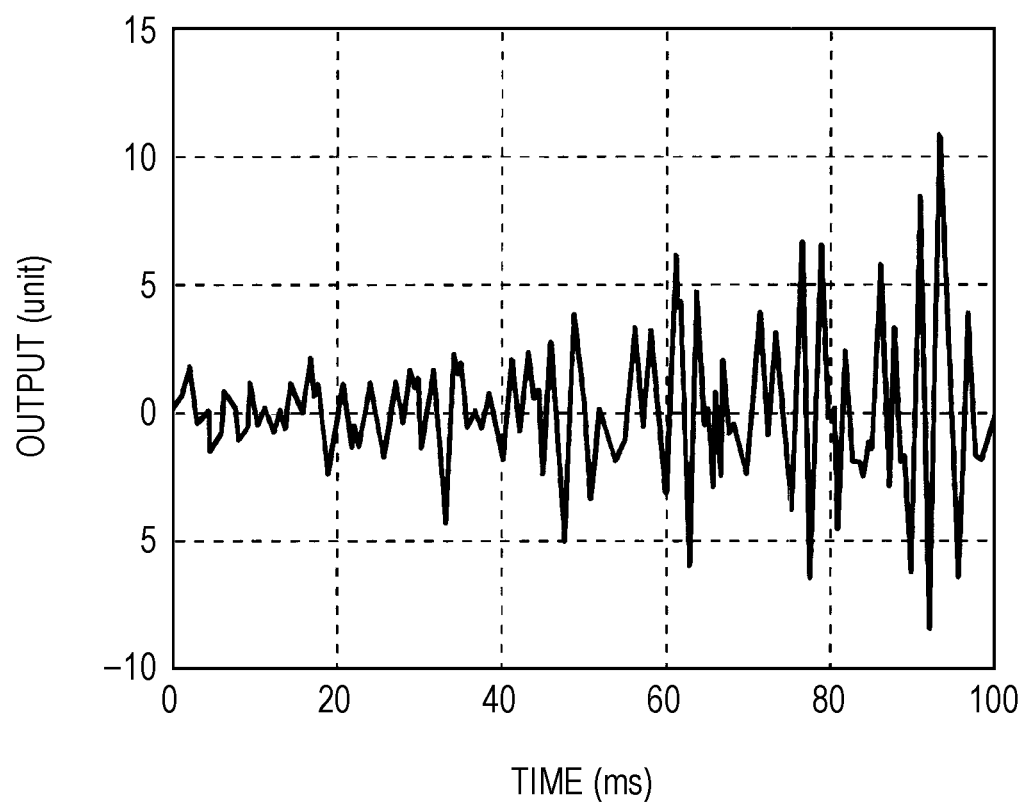
FIG. 21 is a diagram illustrating an output characteristic of the ATS control system in the related art according to an elapse of time.

Although the aforementioned recording apparatus according to the embodiment performs the tracking servo using the ATS light as the tracking servo at the time when the mark recording is performed on the bulk layer 5, as described above with reference to FIGS. 19 to 21, in the case where the tracking servo using the ATS light is performed using the same method as that of the tracking servo in the related art, there is a problem in that the tracking error component is gradually increased every rotation of the disc and diverges.

Herein, in the ATS, as one of the factors of increasing the error signal with time, as described above in FIGS. 20A and 20B, there is a factor in that the gain in the vicinity of the servo band as the transfer characteristic gain of the servo system becomes higher than 0 dB (decibel).

In addition, in the ATS, as one of the factors of increasing the error signal with time, particularly in the case of the detachable recording medium (removable medium) such as the bulk type recording medium 1 of this example, there is a factor in that the manner of the eccentricity is changed according to the attachment/detachment of the disc.

In other words, after the recording is performed on a disc by using a recording apparatus, in the case where the disc is mounted on a different recording apparatus and additional recording is performed by the different recording apparatus, the manner of the occurrence of the eccentricity is changed according to the attachment of the disc, so that the tracking error component is increased by an amount corresponding to the tracking of the mark sequence which is already recorded as the ATS.

In this embodiment, even in the case where the ATS is adapted to the recording system where the disc is detachable, the problem where the error component is increased and diverges with time is prevented, so that it is possible to stabilize the ATS.

Therefore, first, a servo control method of a first embodiment described hereinafter is proposed.

Figure 3:
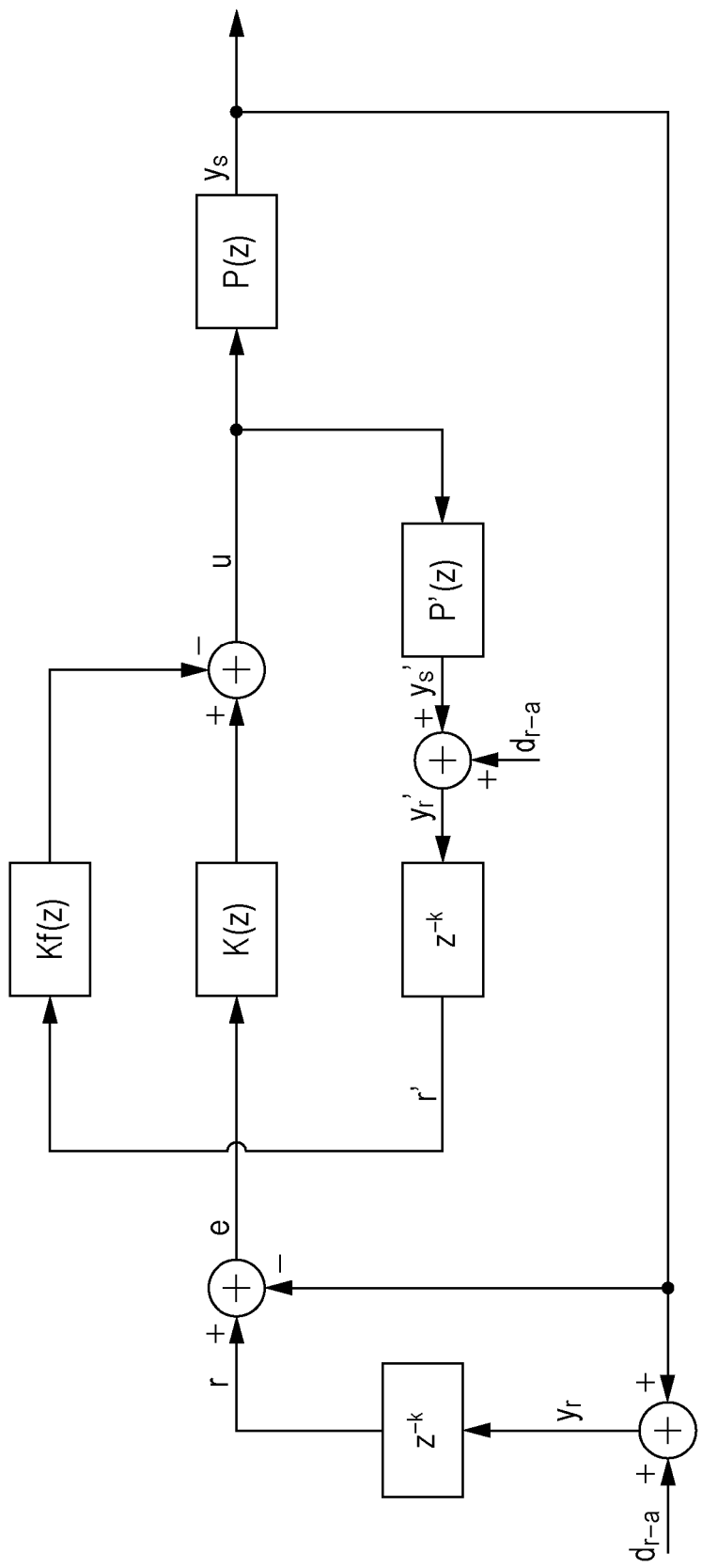
FIG. 3 is a diagram illustrating an ATS control system according to a first embodiment by using transfer function blocks.

FIG. 3 is a diagram illustrating an ATS control system according to the first embodiment by using transfer function blocks.

In FIG. 3, the transfer function block indicated by K(z) denotes a discrete system based transfer function of the servo operator (servo filter) as a controller of the tracking servo system, and the transfer function block indicated by P(z) denotes a discrete system based transfer function of the two-axis actuator 12 (the tracking actuator).

In addition, in this figure, r indicates a control target position (a control target value), and e indicates a tracking error signal (TE-ats). In addition, u indicates an output of the controller (corresponding to the tracking drive signal TD-ats), and $y_s$ indicates the illumination spot position of the ATS light.

In addition, $d_{r-a}$ indicates the distance between the illumination spot position of the recording laser light and the illumination spot position of the ATS light.

In addition, hereinafter, for convenience of description, the transfer function and the transfer characteristic are treated as equivalent to each other, and these functions are denoted by the same reference numeral.

As illustrated, the difference between the illumination spot position $y_s$ of the ATS light and the target position r is the error signal e, and the controller (K(z)) is operated so that the error signal e becomes zero.

The feedback loop as a tracking servo loop is formed by a subtraction block which calculates the error signal e, a transfer function block K(z) as a controller, and a transfer function block P(z) which indicates the transfer characteristic of the actuator.

Figure 19:
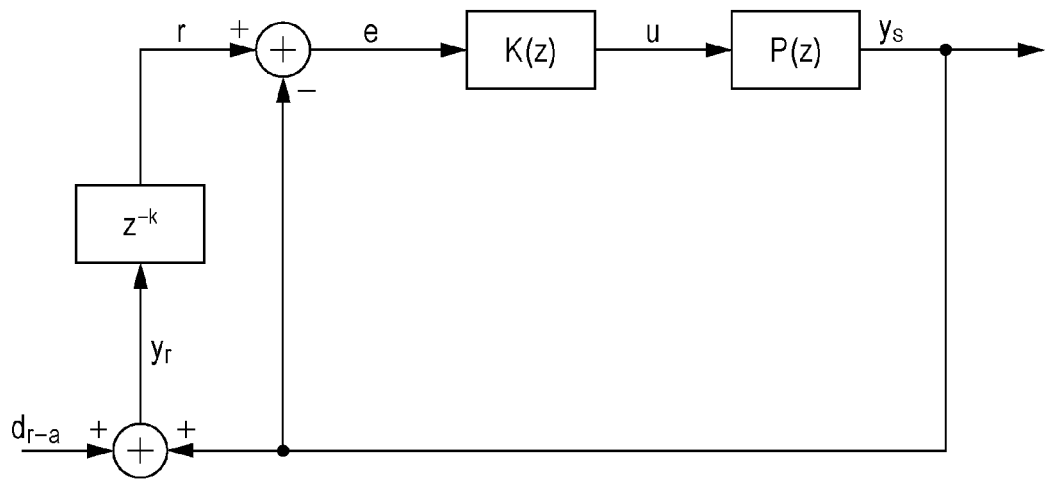
FIG. 19 is a diagram illustrating an ATS control system in the related art by using transfer function blocks.

Herein, similarly to FIG. 19 described above, in FIG. 3, the illumination spot position $y_r$ of the recording light is expressed by adding the distance $d_{r-a}$ to the illumination spot position $y_s$ of the ATS light, and the control target value r is expressed by causing the illumination spot position $y_r$ of the recording light to be subject to the delay time factor $z^{-k}$ corresponding to the time of one disc rotation.

In other words, the control target position r is expressed by the illumination spot position $y_r$ of the recording light prior by the time of one disc rotation.

By comparing the ATS control system according to the first embodiment illustrated in FIG. 3 with the ATS control system of the related art illustrated in FIG. 19 described above, it may be understood that the ATS control system according to the embodiment is configured by adding a transfer function block P'(z), an addition block of distance $d_{r-a}$, a delay time factor $z^{-k}$, and a transfer function block Kf(z) to the ATS control system of the related art (that is, the aforementioned feedback loop).

The transfer function block P'(z) is an emulation of the transfer characteristic (P(z)) of the actuator. The output u of the controller is input to the transfer function block P'(z), so that the estimated value $y_s'$ of the illumination spot position $y_s$ of the ATS light may be obtained.

In addition, herein, the estimated value $y_r'$ of the illumination spot position $y_r$ of the recording light is obtained by adding the distance $d_{r-a}$ to the estimated value $y_s'$, and the estimated value r' of the control target position is obtained by causing the estimated value $y_r'$ to be subject to the delay time factor $z^{-k}$ (the delay time corresponding to the time of one disc rotation). In addition, as illustrated in the figure, the value obtained by causing the estimated value r' to be subject to the transfer function block Kf(z) is applied to the feedback loop. More specifically, in this case, it is configured so that the output of the transfer function block Kf(z) is subtracted from the output of the transfer function block K(z) as a controller.

Figure 4:
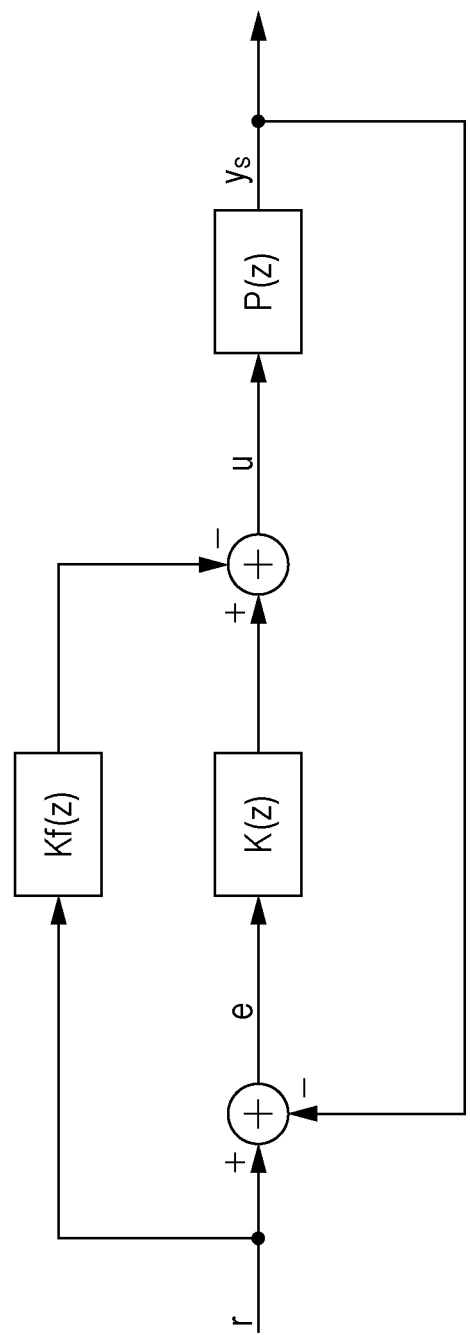
FIG. 4 is an equivalent diagram of the ATS control system illustrated in FIG. 3.

Herein, the ATS control system illustrated in FIG. 3 is equivalent to that illustrated in FIG. 4.

In other words, as illustrated in FIG. 4, in the ATS control system of the embodiment, a feed forward control system (hereinafter, also referred to as a feed forward controller) which performs the feed forward control based on the transfer function block Kf(z) by inputting the control target position r is added to the feedback loop as the tracking servo loop in the related art.

In addition, as described for confirmation, the control target position r may not be detected in an actual configuration. Therefore, in the actual configuration, as illustrated in FIG. 3, the control target value r is estimated by using the transfer characteristic P'(z) emulating the transfer characteristic (P(z)) of the actuator from the output u of the controller.

In the ATS control system of the embodiment, it is controlled by the feed forward control system using the transfer characteristic Kf(z) described above so that the transfer characteristic gain of the feedback loop (tracking servo loop) including the controller (K(z)) is equal to or less than 0 dB over the entire frequency band.

Herein, at this time, the transfer characteristic Kf(z), in other words, the transfer characteristic (the filter characteristic) Kf(z) of the feed forward controller may be calculated so that the transfer characteristic gain is suppressed to be equal to or less than 0 dB over the entire frequency band by taking into consideration the intrinsic transfer characteristic of the tracking servo loop.

As an example, in this example, the transfer characteristic Kf(z) is set as follows.

First, as the presumption, the transfer characteristic P(z) and the transfer characteristic K(z) are as follows.

$$P(z) = 9.433 \times 10^{-4} \frac{z^{-1} + z^{-2}}{1 - 1.9952826 z^{-1} + 0.9952887 z^{-2}}$$ [Equation 1]

$$K(z) = 37.203 \frac{1 - 1.931590 z^{-1} + 0.933350 z^{-2}}{1 - 1.532649 z^{-1} + 0.532942 z^{-2}}$$ [Equation 2]

Under the presumption, in this example, the transfer characteristic Kf(z) is set as follows. In addition, the sampling frequency is set to 400 kHz.

$$Kf(z) = 37.203 \frac{0.837660 - 1.640718 z^{-1} + 0.803058 z^{-2}}{1 - 1.532649 z^{-1} + 0.532942 z^{-2}}$$ [Equation 3]

Figure 5A:
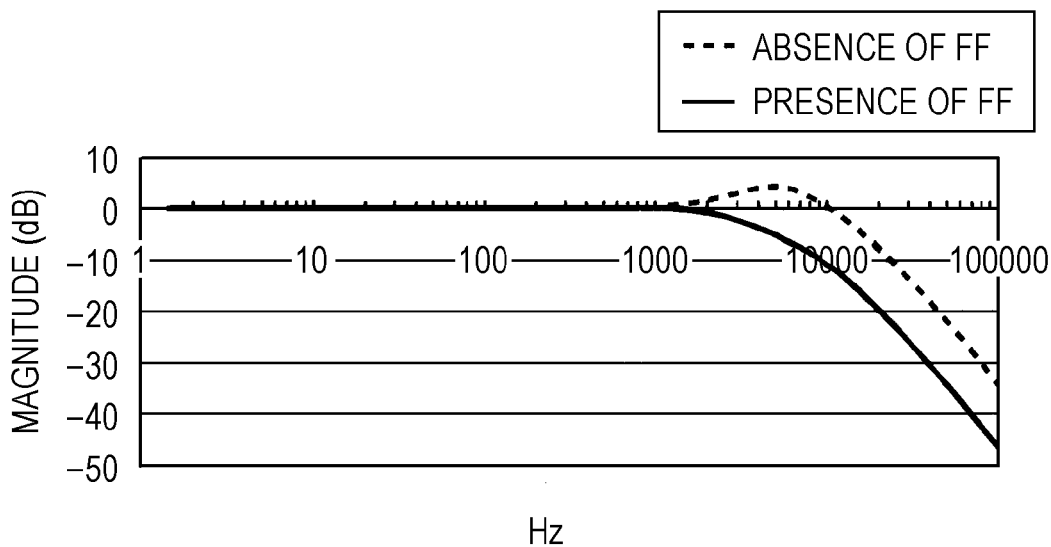
FIGS. 5A and 5B are diagrams illustrating transfer characteristics of the ATS control system according to the first embodiment.
Figure 5B:
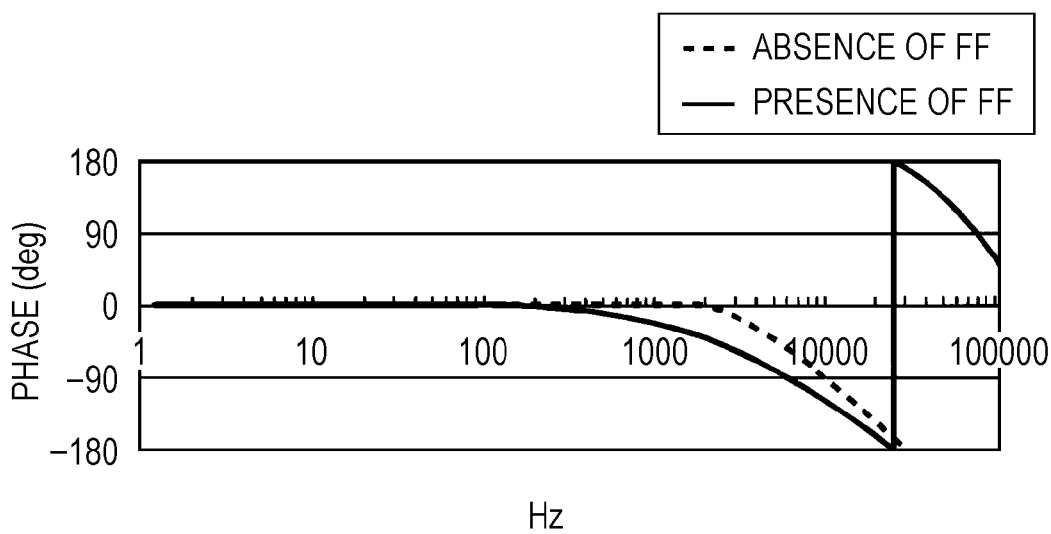

FIGS. 5A and 5B are diagrams illustrating the transfer characteristic of the ATS control system of the first embodiment.

FIG. 5A illustrates the transfer characteristic gain (frequency-amplitude characteristic), and FIG. 5B illustrates the frequency-phase characteristic.

In addition, for the comparison, FIGS. 5A and 5B illustrate the characteristic of the case where the feed forward control according to the first embodiment is not performed (absence of FF: corresponding to the ATS control system of the related art) by broken lines.

It may be understood from FIGS. 5A and 5B that, if the feed forward control according to the embodiment is performed, in the ATS control system of the related art where FF is absent, the gain in the band where the gain is higher than 0 dB is suppressed to be equal to or less than 0 dB.

Accordingly, it is possible to prevent a problem where the error signal is increased and diverges with time.

Figure 6A:
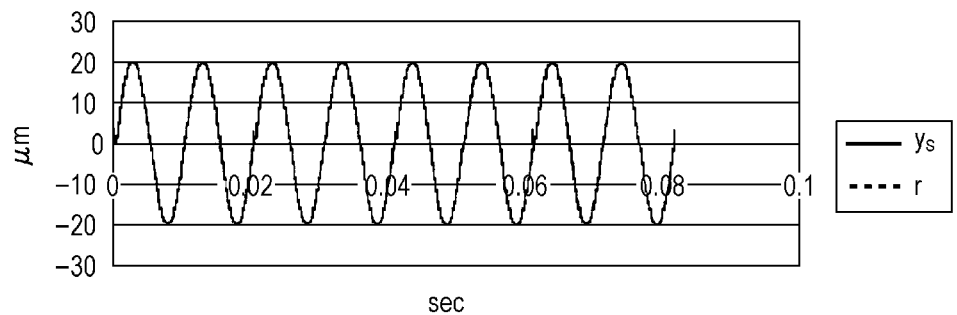
FIGS. 6A to 6C are diagrams illustrating simulation results of the ATS control system according to the first embodiment.
Figure 6B:
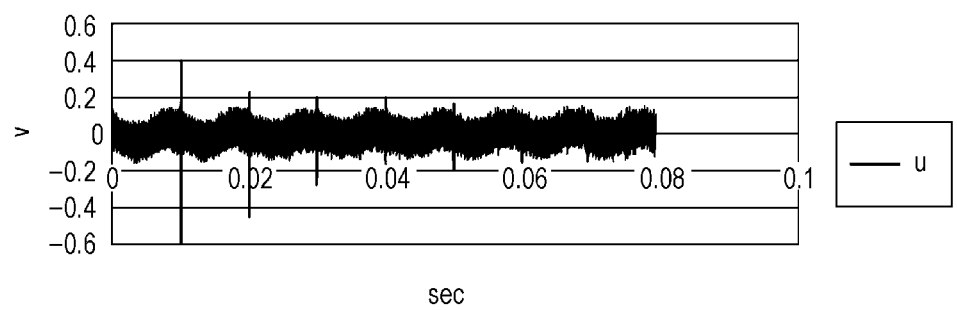
Figure 6C:
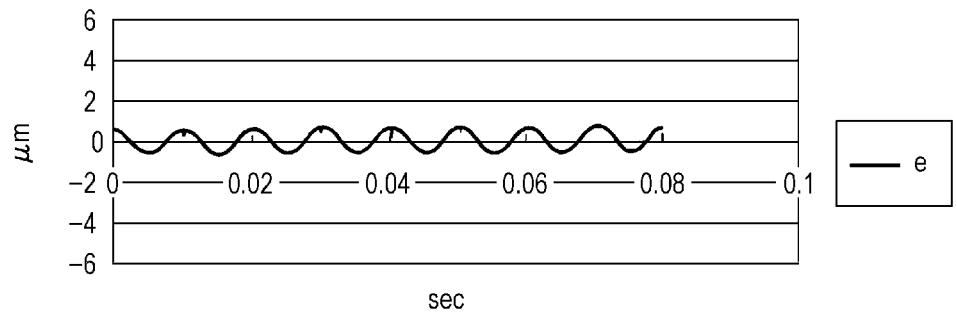
Figure 7A:
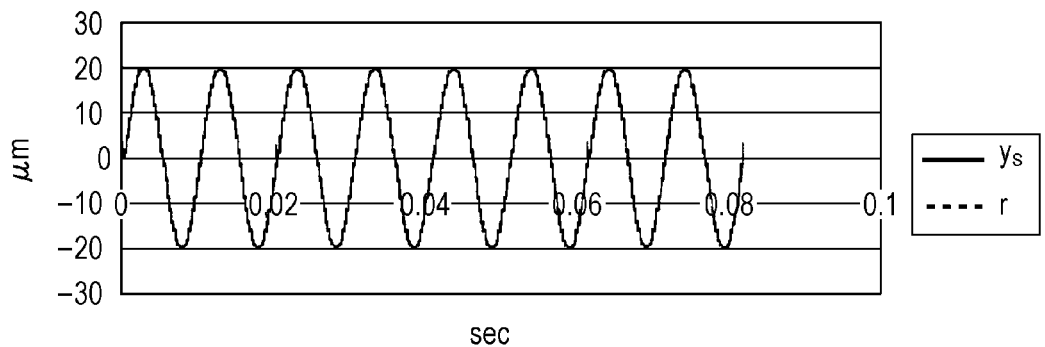
FIGS. 7A to 7C are diagrams illustrating simulation results of a case (a case of an ATS control system in the related art) where there is no feed forward control of the first embodiment.

Herein, FIGS. 6A to 6C illustrate the simulation results of the ATS control system of the first embodiment. In addition, for the comparison, FIGS. 7A to 7C illustrate the simulation results of the case of the absence of the feed forward control as the first embodiment.

Figure 7B:
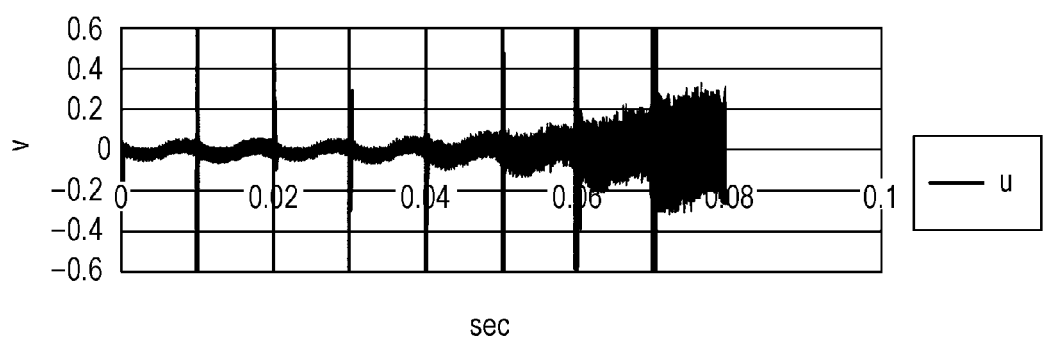
Figure 7C:
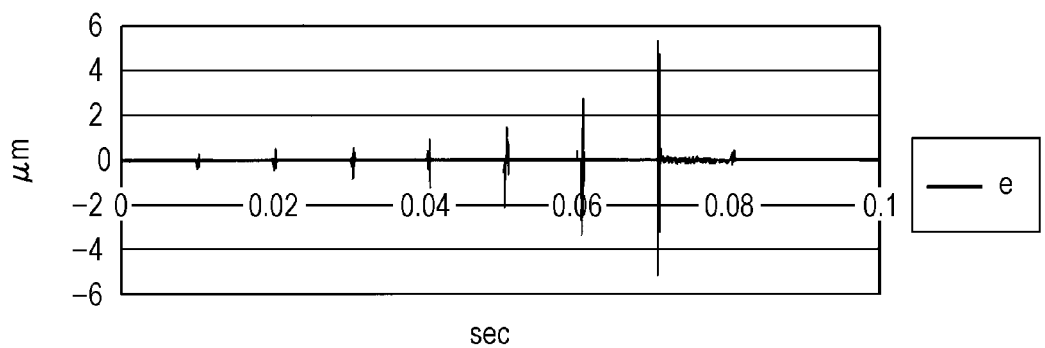

Among FIGS. 6A to 6C and FIGS. 7A to 7C, FIGS. 6A and 7A illustrate the results of the simulation of the illumination spot position $y_s$ (solid line) of the ATS light and the control target position r (broken line); and FIGS. 6B and 7B illustrate the results of the simulation of the output u of the controller. In addition, FIGS. 6C and 7C illustrate the results of the simulation of the error signal e.

In addition, in the simulation, k=4000. In addition, the sampling frequency is 400 kHz. In addition, therefore, the disc rotation frequency corresponds to 100 Hz.

In addition, in this simulation, a frequency-varying component of ±20 μm is applied as the eccentricity component.

First, in FIGS. 6A and 7A, in the case of the embodiment as well as the case where FF is absent in FIGS. 7A to 7C (that is, the case of the related art), the illumination spot position $y_s$ is caused to track the control target position r, so that the graphs are substantially overlapped.

Therefore, referring to FIGS. 6B and 7B and FIGS. 7C and 7C, it may be understood that, in the case of the related art illustrated in 1 FIGS. 7A to 7C, the output u of the controller and the error signal e have a tendency of being increased and diverging with time, and in the case of the embodiment illustrated in FIGS. 6A to 6C, the increasing of all the output u of the controller and the error signal e are suppressed, and the diverging thereof is prevented. In other words, the control may be stabilized as much as the suppressed amount.

In this manner, according to the ATS control method of the first embodiment, it is possible to improve the characteristic of the ATS control system of the related art in that the transfer characteristic gain is larger than 0 dB in the servo band. As a result, unlike the ATS control system of the related art, it is possible to prevent the occurrence of a problem in that the tracking error component is increased to diverge with time.

Therefore, it is possible to stabilize the ATS.

In addition, as understood from FIGS. 6A to 6C illustrating the result of the simulation result where the eccentricity component are considered, according to the embodiment, even in the case where the appending is performed on a removable medium such as the bulk type recording medium 1, it is possible to stabilize the ATS.

In addition, in FIGS. 6B and 6C, although the spike-shaped noise occurs in the output u of the controller and the error signal e, this occurs as a result of the accumulation of the output of the transfer function block P'(z) in the memory (the delay time factor $z^{-k}$) in a transient response time interval at the servo-on time in the simulation.

The spike-shaped noise may be prevented, for example, by taking measures of repeating the rotation by setting the feed forward control to be off in a predetermined time interval after the servo-on of the ATS by the time when the servo is stabilized and, after that, starting the accumulation of the output of the transfer function block P'(z) by setting the feed forward control to be on. In other words, the spike-shaped noise occurs in association with the simulation method in this case, and thus, the occurrence thereof is not inevitable.

[1-4. Example of Configuration of Servo Circuit]

Figure 8:
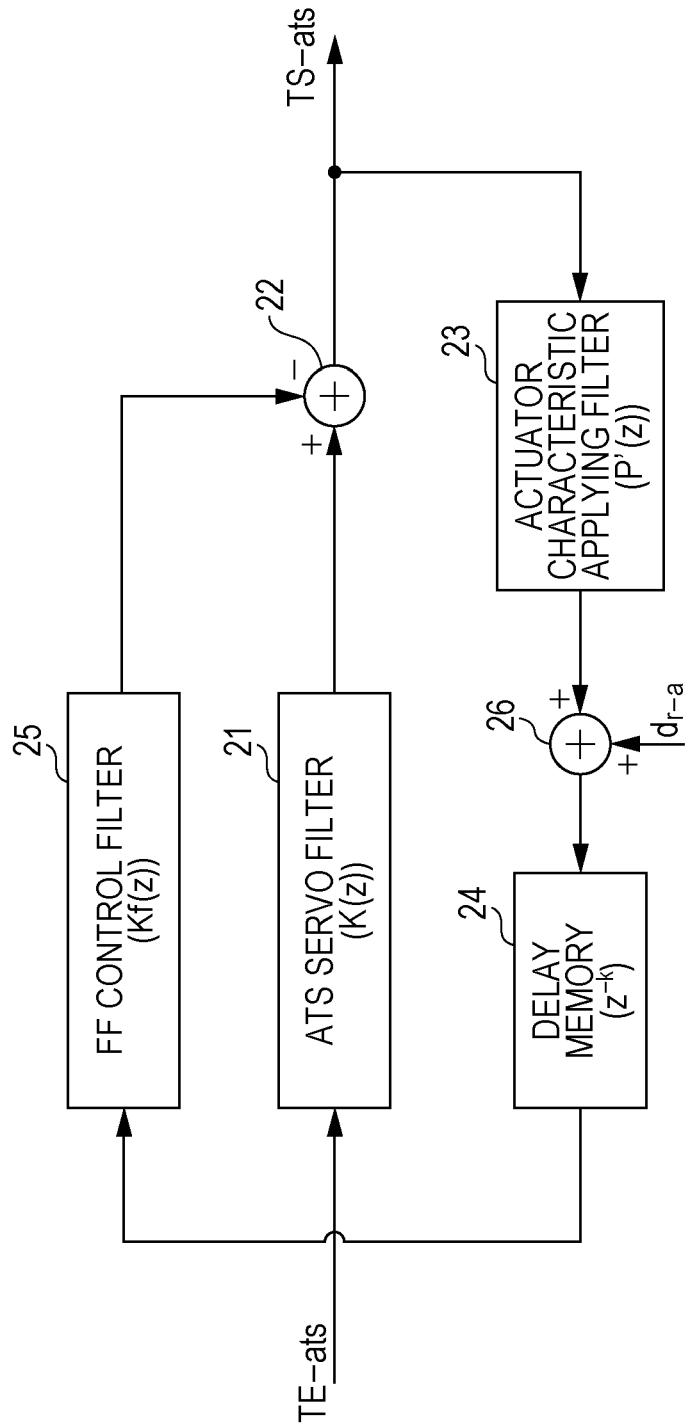
FIG. 8 is a diagram illustrating an internal configuration of an ATS control circuit for embodying the ATS control of the first embodiment.

FIG. 8 illustrates an internal configuration of the ATS control circuit 14 for embodying the ATS control of the aforementioned first embodiment.

As illustrated in the figure, the ATS control circuit 14 includes an ATS servo filter 21, a subtraction unit 22, an actuator characteristic applying filter 23, a delay memory 24, a FF control filter 25, and an addition unit 26.

The tracking error signal TE-ats of the error signal generation circuit 13 illustrated above in FIG. 2 is input to the ATS servo filter 21.

The ATS servo filter 21 corresponds to the transfer function block K(z) as described above in correspondence with FIG. 3.

The ATS servo filter 21 is configured with a digital filter, for example, an FIR (Finite Impulse Response) filter or the like and performs a filter process (servo calculation process) for applying a predetermined frequency characteristic necessary for implementing the tracking servo control of the loop gain application, the phase compensation, or the like on the tracking error signal TE-ats.

As illustrated in the figure, the result of the process of the ATS servo filter 21 is output through the subtraction unit 22 as the tracking servo signal TS-ats.

The actuator characteristic applying filter 23 corresponds to the transfer function block P'(z) illustrated in FIG. 3.

The actuator characteristic applying filter 23 is configured with a digital filter, for example, an FIR filter or the like, and the filter characteristic thereof is set to the filter characteristic corresponding to the emulation of the transfer characteristic P(z) of the two-axis actuator 12 (the aforementioned tracking actuator).

The actuator characteristic applying filter 23 performs the filter process, which is based on the filter characteristic set in this manner, on the tracking servo signal TS-ats to apply the frequency characteristic corresponding to the transfer characteristic P(z) to the tracking servo signal TS-ats.

The output of the actuator characteristic applying filter 23 corresponds to the estimated value $y_s'$ of the illumination spot position $y_s$ of the ATS light illustrated in FIG. 3.

The distance $d_{r-a}$ is added to the estimated value $y_s'$ by the addition unit 26. Therefore, the value corresponding to the estimated value $y_r'$ of the illumination spot position $y_r$ of the recording light may be obtained.

The delay memory 24 corresponds to the delay time factor $z^{-k}$ illustrated in FIG. 3.

The delay memory 24 stores the output of the addition unit 26 for the time of one disc rotation, and after that, the delay memory 24 outputs the output of the addition unit 26, which is delayed by the time of one disc rotation.

The FF control filter 25 corresponds to the transfer function block Kf(z) illustrated in FIG. 3.

The FF control filter 25 is also configured with a digital filter, for example, an FIR filter, or the like, and the filter characteristic corresponding to the aforementioned transfer characteristic Kf(z) is set as the filter characteristic thereof. The FF control filter 25 performs a filter process, which is based on a filter characteristic corresponding to the transfer characteristic Kf(z), on the output (corresponding to the estimated value r' of the control target value r) of the delay memory 24 to apply a frequency characteristic corresponding to the transfer characteristic Kf(z) to the output of the delay memory 24.

As illustrated in the figure, the output of the FF control filter 25 (that is, corresponding to the output of the feed forward controller) may be applied to a feed back loop by the subtraction unit 22. More specifically, in this case, the subtraction unit 22 is disposed just after the ATS servo filter 21, so that the subtraction unit 22 subtracts the output of the FF control filter 25 from the output of the ATS servo filter 21.

<2. Second Embodiment>

[2-1. Servo Control Method According to Second Embodiment]

Like the first embodiment described above, if the feed forward controller which performs the feed forward control by using the estimated value r' of the control target value r is configured to be added to the feedback loop included in the ATS control system of the related art, according to the setting of the filter characteristic (Kf(z)) of the feed forward controller, it is possible to prevent the transfer characteristic gain of the feedback loop from being higher than 0 dB, so that it is possible to stabilize the ATS in this point.

However, by comparing FIG. 6C and FIG. 7C described above, it may be understood that, in the case of the configuration as described in the first embodiment, the tracking error component is larger than that of the related art. More specifically, the tracking error component of the first embodiment is larger than the eccentricity of ±20 μm by about ±1 μm. Therefore, the tracking error component of the first embodiment is disadvantageous in terms of the tracking performance.

Therefore, in the second embodiment, in order to improve the tracking performance, the feed forward control is also introduced.

Figure 9:
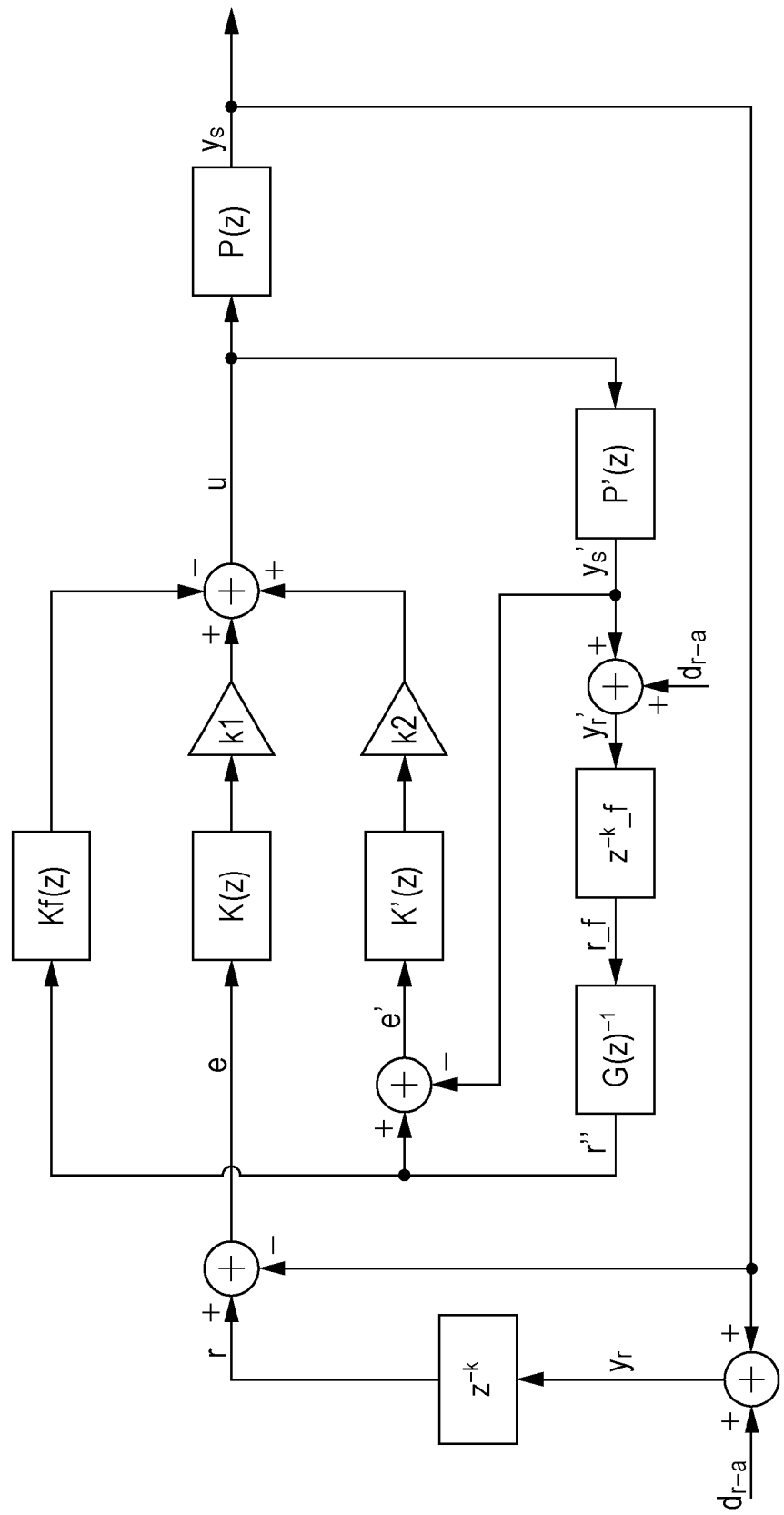
FIG. 9 is a diagram illustrating an ATS control system according to a second embodiment by using transfer function blocks.

FIG. 9 illustrates the ATS control system of the second embodiment by using the transfer function block.

In comparison with FIG. 3 described above, in the feed forward controller included in the ATS control system of this case, a delay time factor $z^{-k}\_f$ is installed instead of the delay time factor $z^{-k}$ in the feed forward controller illustrated in FIG. 3, and a transfer function block $G(z)^{-1}$ is newly added. The output of the delay time factor $z^{-k}\_f$ is configured to be applied through the transfer function block $G(z)^{-1}$ to the transfer function block Kf(z).

As illustrated in the figure, in this case, the output of the transfer function block Kf(z) is subtracted from the output of the transfer function block K(z) after the application to the later-described multiplication block k1, so that the output of the transfer function block Kf(z) is applied to the feedback loop including the transfer function block K(z).

Herein, as a factor of causing the deterioration in the tracking performance as described above, there is occurrence of the phase delay in the ATS control system due to the operation of the transfer function Kf(z). In other words, as understood with reference to FIG. 5B described above, as the frequency-phase characteristic of the ATS control system, the phase delay occurs in the vicinity of the servo band according to the operation of the transfer function K(z). Due to this, according to the configuration described in the first embodiment, the deterioration in the tracking performance occurs.

By considering this point, in the second embodiment, in the feed forward controller including the transfer function block Kf(z), a aforementioned delay time factor $z^{-k}\_f$ and a transfer function block $G(z)^{-1}$ are provided.

More specifically, unlike the delay time factor $z^{-k}$ illustrated in FIG. 3, the delay time factor $z^{-k}\_f$ allows the estimated value $y_r'$ of the illumination spot position $y_r$ of the recording light not to be delayed by the time of one rotation of the disc 1 but to be delayed by a predetermined time less than the time of one rotation of the disc 1.

In other words, in this case, since the phase characteristic is improved by advancing the phase in the phase delay band described above, the estimated value $y_r'$ of the illumination spot position $y_r$ of the recording light is applied to a latter stage in the manner that the pre-reading is performed in comparison with the case of the first embodiment.

Hereinafter, the delay output of the delay time factor $z^{-k}\_f$ as the output of the pre-reading is referred to as a delay output r_f.

The transfer function block $G(z)^{-1}$ indicates a transfer function calculated based on the delay output r_f so that it is possible to suppress the phase delay occurring in the vicinity of the servo band due to the operation of the transfer function Kf(z) which is indicated by a solid line in FIG. 5B. In other words, the transfer characteristic $G(z)^{-1}$ of the transfer function block $G(z)^{-1}$ may be configured so that, when the output of the transfer function block $G(z)^{-1}$ may be applied through the transfer function block Kf(z) to the feedback loop including the transfer function block K(z) as a controller, the phase delay in the vicinity of the servo band is suppressed (ideally, cancelled) in the frequency-phase characteristic of the ATS control system including the feedback loop.

In addition, as described later, in this example, as clearly understood from the setting of $G(z)^{-1}=1$, it is not necessary to install the transfer function block $G(z)^{-1}$.

Herein, the operation for improving the phase characteristic by the delay time factor $z^{-k}\_f$ and the transfer function block $G(z)^{-1}$ described above is applied to only the feed forward control side and is not applied to the feedback loop side, there may be a problem in that a discrepancy occurs in the overall ATS control system.

Therefore, in this example, the pseudo feedback control system which uses the output of the transfer function block $G(z)^{-1}$ as the value (hereinafter, denoted by the output r″) corresponding to the value of the control target position r is formed, and the output thereof is joined (combined) to the real (actual) feedback loop including the transfer function block K(z).

More specifically, in the pseudo feedback control system, the estimated value $y_s'$ of the illumination spot position of the ATS light as the output of the transfer function block P'(z) is subtracted from the output r″ of the transfer function block $G(z)^{-1}$, so that the error signal e' corresponding to the error signal e is obtained.

In addition, the error signal e' is input to the transfer function block K'(z) emulating the transfer function K(z) of the controller, and the output of the transfer function block K'(z) is applied through the multiplication block k2 to the actual feedback loop.

In addition, as described for confirmation, since the transfer function K(z) corresponds to the filter characteristic, in the case where the block of the transfer function K'(z) is embodied by the filter process, the transfer function K(z) and the transfer function K'(z) are set so as to be the same.

At this time, the output of the multiplication block k2 is subtracted from the output of the transfer function block K(z) after the application of the multiplication block k1 as illustrated in this figure, and the result thereof is applied (combined) to the actual feedback loop. In other words, in this example, the output of the transfer function block K(z) as the actual feedback controller and the output of the transfer function block K'(z) as the pseudo feedback controller are weighted by the coefficients applied to the multiplication block k1 and the multiplication block k2, and the results thereof are combined.

In order to prevent the total gain of the ATS control system from being changed from the original gain, the weighting of this case is performed so that the total sum thereof is 1. In other words, the waiting is performed so that the coefficient k1 applied by the multiplication block k1 and the coefficient k2 applied by the multiplication block k2 satisfy k1+k2=1.

Herein, with respect to the coefficient k1 and the coefficient k2, if the coefficient k1 is set to be too small, the weighting of the actual feedback loop system becomes too small, so that there is a problem in that it may be difficult to completely track the external disturbance component. On the other hand, if the coefficient k2 is set to be too small, the function of the pseudo feedback control system becomes too small, so that there may be a problem in that a predetermined effect may not be obtained. Therefore, by taking into consideration the balance of effects, the coefficients k1 and k2 may be derived and set to the values which are considered to be experimentally optimal values.

Figure 10A:
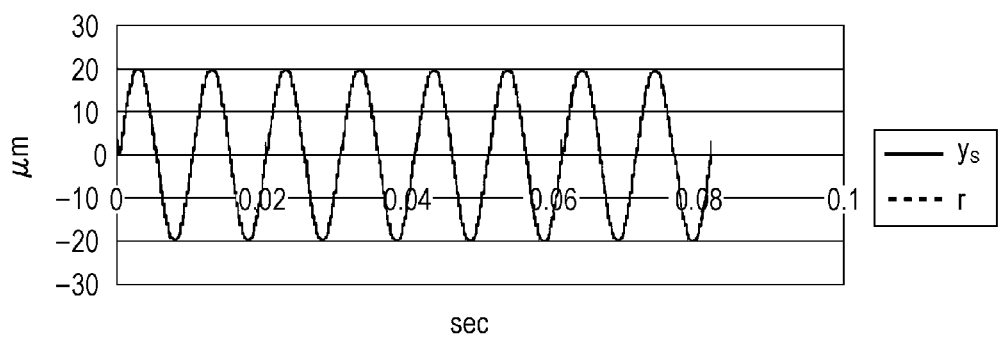
FIGS. 10A to 10C are diagrams illustrating simulation results of the ATS control system according to the second embodiment.
Figure 10B:
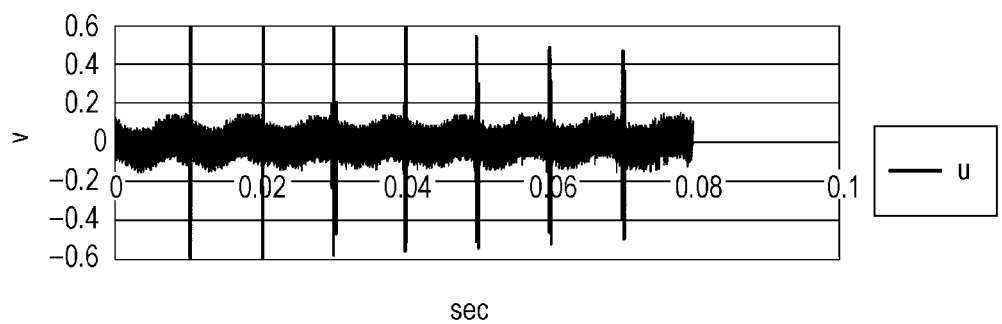
Figure 10C:
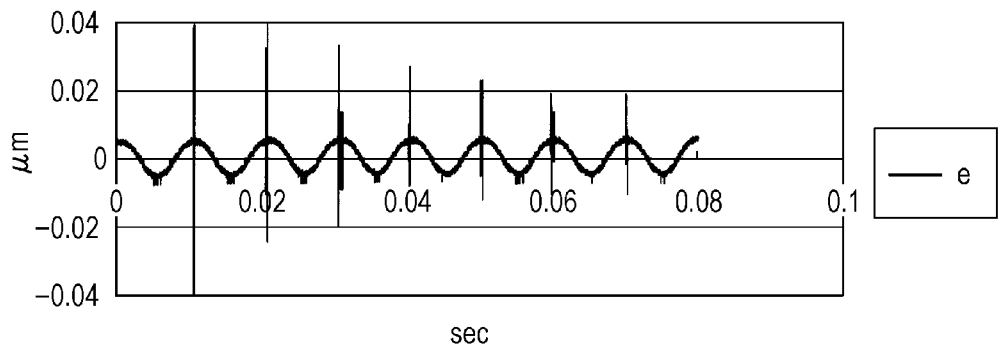

FIGS. 10A to 10C illustrate the simulation results of the ATS control system of the second embodiment illustrated in FIG. 9. FIG. 10A illustrates the result of the simulation of the illumination spot position $y_s$ (solid line) of the ATS light and the control target position r (broken line); FIG. 10B illustrates the result of the simulation of the output u of the controller; and FIG. 10C illustrates the result of the simulation of the error signal e.

In addition, in the simulation of this case, it is set that k=4000 and the sampling frequency=400 kHz. In addition, in this case, the eccentricity component is also ±20 μm.

In addition, in this example, the pre-reading of 26 samples is performed on the transfer function block P'(z). In other words, the delay time factor $z^{-k}\_f$ is $z^{-(k-26)}\_f$.

In addition, in this example, $G(z)^{-1}=1$ is set as the transfer characteristic $G(z)^{-1}$.

In addition, the coefficient k1 and the coefficient k2 are set so that k1=0.25 and k2=0.75.

First, by comparing FIG. 10A with FIG. 6A, it may be understood that the illumination spot position $y_s$ and the control target position r of the ATS light have the same result as those of the case of the first embodiment.

In addition, the output u of the controller of FIG. 10B has almost the same result as that of the case of the first embodiment (FIG. 6B).

In addition, the changing width of the error signal e illustrated in FIG. 10C is suppressed so as to be equal to or less than about ±0.01 μm (10 nm) (excluding the spike-shaped portion), so that it may be understood that, according to the second embodiment, the tracking performance is improved in comparison with the case of the first embodiment.

In addition, similarly to the first embodiment, the spike-shaped noise occurring in the output u of the controller or the error signal e depends on the simulation method of this case, and as described above, the noise may be prevented by not accumulating the output of the transfer function block P'(z) from the time when the servo is turned on by the time when the servo is stabilized.

In this manner, according to the second embodiment, it is possible to stabilize the ATS by preventing the tracking error component from diverging and to improve the tracking performance of the servo.

[2-2. Example of Configuration of Servo Circuit]

Figure 11:
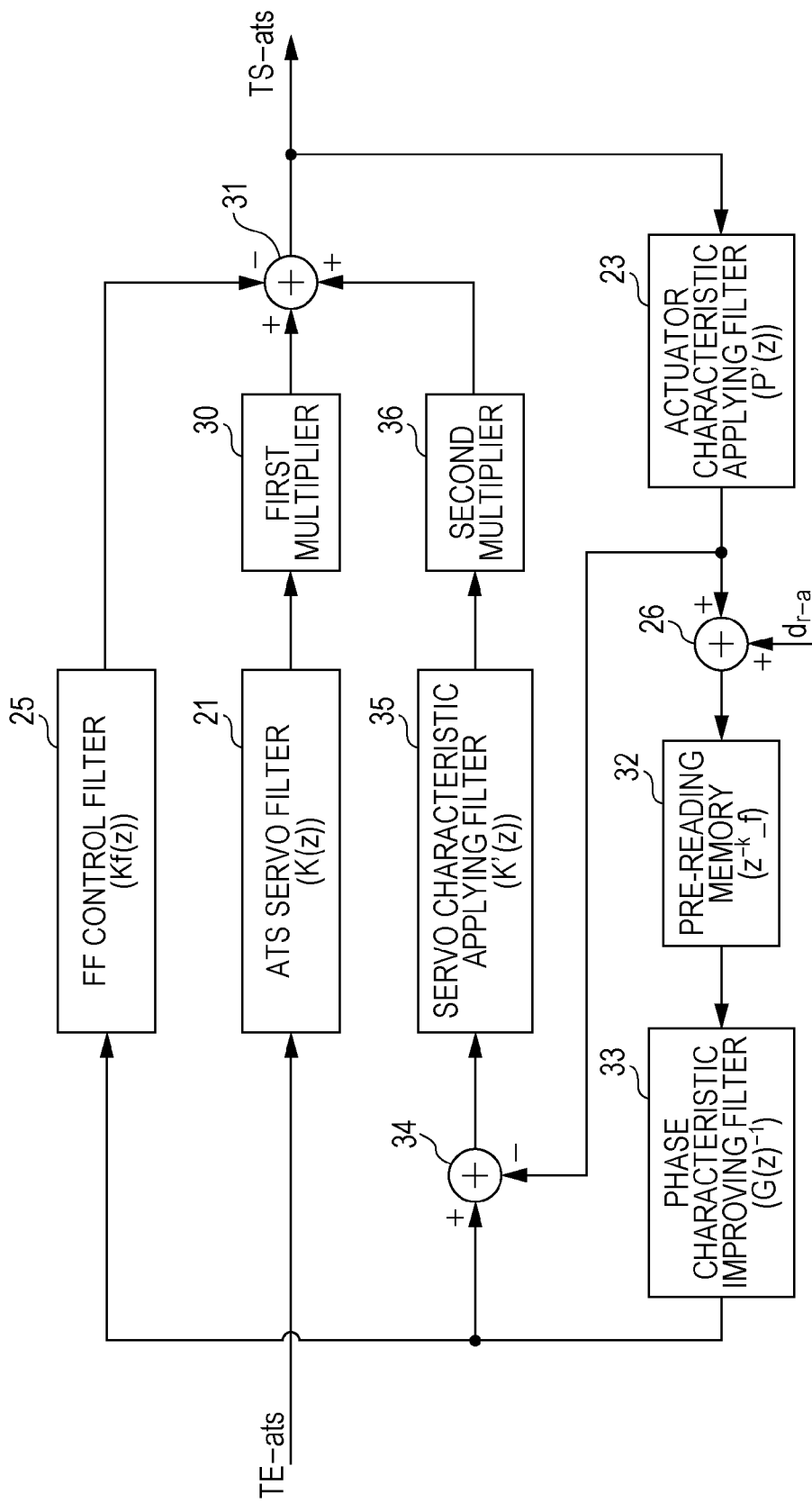
FIG. 11 is a diagram illustrating an internal configuration of an ATS control circuit for embodying the ATS control of the second embodiment.

FIG. 11 illustrates an internal configuration of the ATS control circuit 14 in the case where the aforementioned ATS control of the second embodiment is embodied.

In addition, in FIG. 11, the components described above with reference to FIG. 8 are denoted by the same reference numerals, and the description thereof is omitted.

As understood from the comparison with FIG. 8, in this case, an addition/subtraction unit 31 instead of the subtraction unit 22 is installed in the ATS control circuit 14, and a pre-reading memory 32 instead of the delay memory 24 is installed in the feed forward control system including the FF control filter 25. In addition, a phase characteristic improving filter 33 is further included.

In addition, in this case, a subtraction unit 34, a servo characteristic applying filter 35, a first multiplication unit 30, and a second multiplication unit 36 are further included.

First, in the feed forward control system, the output of the actuator characteristic applying filter 23 is input through the addition unit 26 to the pre-reading memory 32 and input to the subtraction unit 34.

The pre-reading memory 32 corresponds to the delay time factor $z^{-k}\_f$ illustrated in FIG. 9 and is configured so as to output the output of the addition unit 26 which is delayed by a predetermined time of less than the time of one disc rotation. In other words, the pre-reading memory 32 is configured to cause the output of the addition unit 26 (that is, the estimated value $y_r'$) of an elapsed predetermined time to be storable and sequentially reads the estimated values $y_r'$ prior by a time of less than the time of one disc rotation among the stored estimated values $y_r'$.

The phase characteristic improving filter 33 corresponds to the transfer function block $G(z)^{-1}$ illustrated in FIG. 9, and is constructed with a digital filter, for example, an FIR filter or the like.

As understood from the above description, in the frequency-phase characteristic of the case (solid line) of the presence of FF illustrated in FIG. 5B, in other words, in the frequency-phase characteristic of the ATS control system of the case where the pre-reading memory 32 and the phase characteristic improving filter 33 are not interposed in the feed forward controller, the phase characteristic improving filter 33 is configured to have the filter characteristic calculated so that the phase delay in the vicinity of the servo band is suppressed (ideally, cancelled).

Herein, as described above, in this example, it is set so that $G(z)^{-1}=1$. From this point, in this example, it is not necessary to provide the phase characteristic improving filter 33, so that the phase characteristic improving filter 33 may be omitted.

The output of the phase characteristic improving filter 33 is input to the FF control filter 25 and is input to the subtraction unit 34.

The subtraction unit 34 subtracts the output of the actuator characteristic applying filter 23 (corresponding to the estimated value $y_s'$ of the illumination spot position $y_s$ of the ATS light) from the output of the phase characteristic improving filter 33 (that is, the value corresponding to the value of the control target position r: corresponding to the output r" in FIG. 9). In other words, accordingly, the signal corresponding to the error signal e' illustrated in FIG. 9 is generated.

The servo characteristic applying filter 35 corresponds to the transfer function block K'(z) illustrated in FIG. 9 and is configured with a digital filter, for example, an FIR filter or the like. As understood from the above description, the servo characteristic applying filter 35 has the same filter characteristic as that of the ATS servo filter 21 corresponding to the transfer function block K(z).

In addition, as illustrated in the figure, in this case, the output of the ATS servo filter 21 is input through the first multiplication unit 30 to the aforementioned addition/subtraction unit 31, and the output of the servo characteristic applying filter 35 is input through the second multiplication unit 36 to the addition/subtraction unit 31.

The addition/subtraction unit 31 has a function of adding the output of the first multiplication unit 30 and the output of the second multiplication unit 36 and a function of subtracting the output of the FF control filter 25 from the output of the first multiplication unit 30. The addition/subtraction unit 31 outputs the calculation result obtained through the addition/subtraction as the tracking servo signal TS-ats.

Herein, as understood from the above description, the coefficient (k1) which the first multiplication unit 30 multiplies to the output of the ATS servo filter 21 and the coefficient (k2) which the second multiplication unit 36 multiplies to the output of the servo characteristic applying filter 35 are set so that k1+k2=1.

In addition, in this example, although the filter characteristic of the phase characteristic improving filter 33 is set so that $G(z)^{-1}=1$, the inverse characteristic of the characteristic indicated by a solid line in FIG. 5B may also be set as $G(z)^{-1}$, so that the phase delay characteristic may be further improved (the phase delay is cancelled).

<3. Modified Example>

Hereinbefore, although the embodiments of the present disclosure are described, the present disclosure is not limited to the specific examples described hereinbefore.

For example, in the description hereinbefore, the case where the optical disc recording medium which is the recording target of the recording apparatus of the present disclosure is used as the so-called bulk type optical disc recording medium including the bulk-shaped recording layer having neither a nor a reflection surface on which the position guide is formed is exemplified. However, the present disclosure may be very appropriately adapted to the case where an optical disc recording medium (referred to as a multi-layer recording medium) including a recording layer having a multi-layered structure having a plurality of reflection surfaces (semi-transparent recording films), for example, as illustrated in FIG. 12 described later is used as the recording target.

Figure 12:
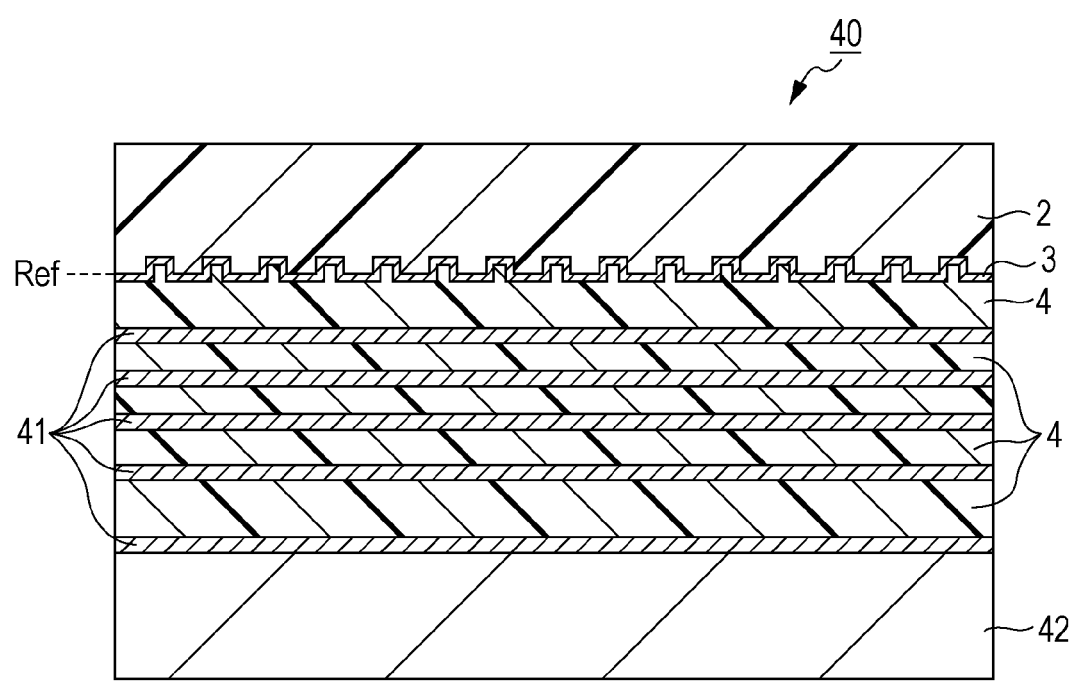
FIG. 12 is a diagram illustrating another example of the optical disc recording medium as a recording target.
Figure 13:
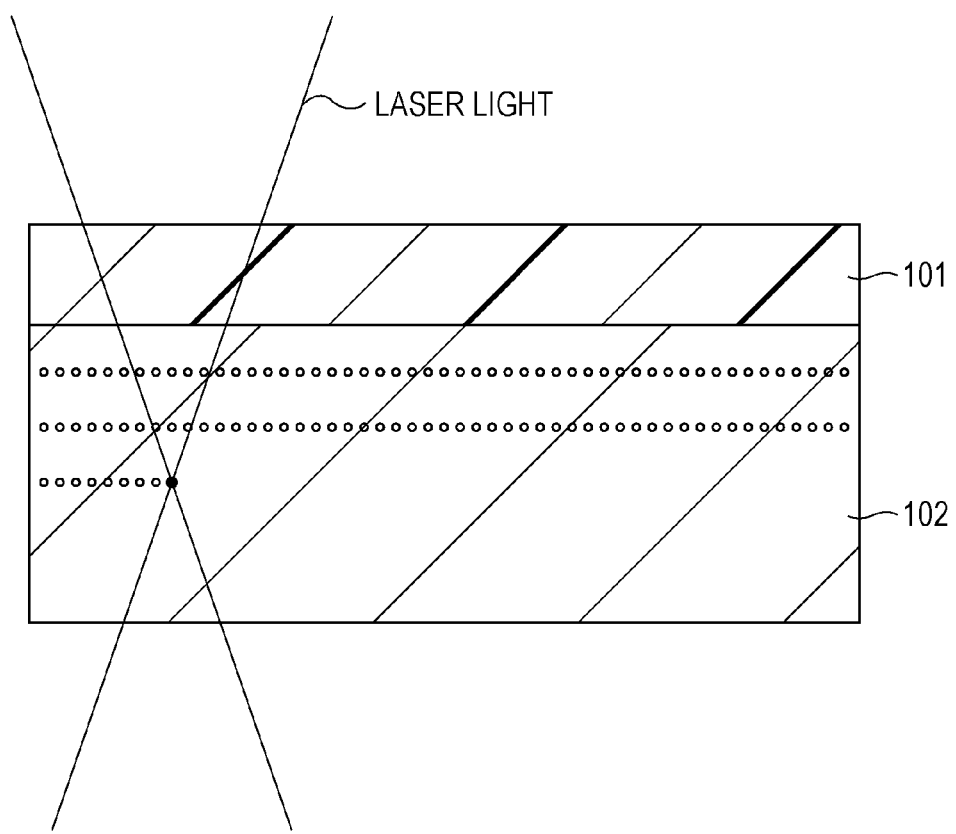
FIG. 13 is a diagram illustrating a bulk recording scheme.
Figure 14:
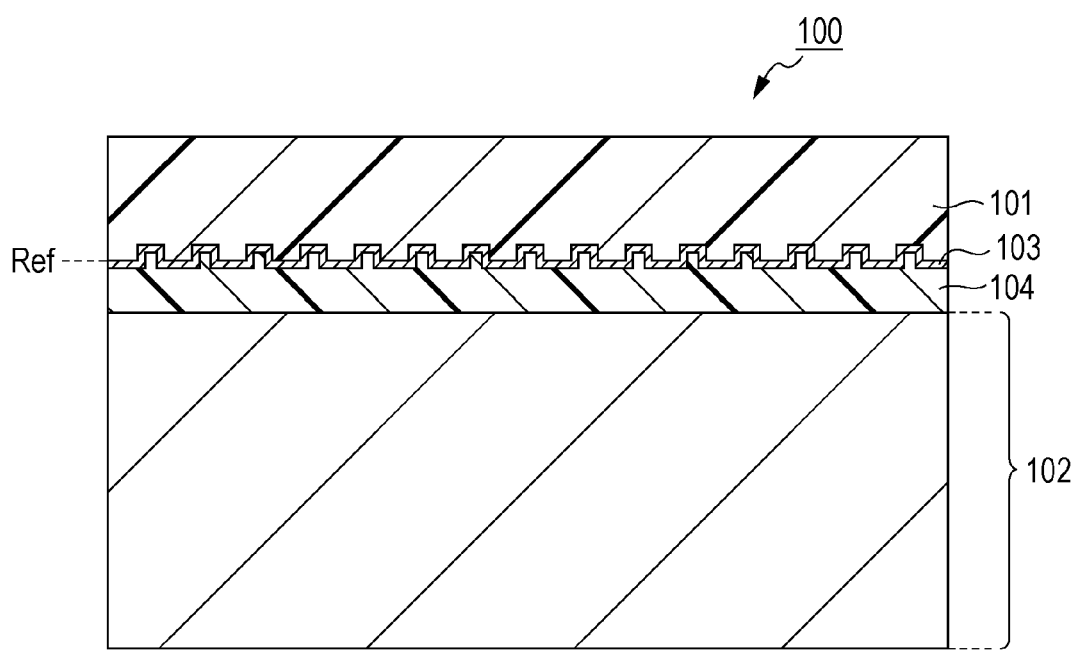
FIG. 14 is a diagram illustrating an example of a cross-sectional structure of an actual bulk type recording medium having a reference surface.

In FIG. 12, the multi-layer recording medium 40 of this case is the same as the bulk type recording medium 1 illustrated in FIG. 1 in that the cover layer 2, the selective reflection film 3, and the intermediate layer 4 are formed in this order from the upper layer side. However, as illustrated in this figure, in the multi-layer recording medium 40, a recording layer having a layer structure where a predetermined number of the semi-transparent recording film 41 and the intermediate layer 4 are repetitively laminated is disposed instead of the bulk layer 5. At this time, the semi-transparent recording film 41 which is formed in the lowermost layer is laminated on a substrate 42. In addition, a total reflection recording film may be used as the recording film which is formed on the lowermost layer.

In addition, for the convenience of illustration in this figure, the number of the recording films is five. However, the number of the recording films formed in the recording layer is not limited thereto.

Herein, it should be noted that the position guide in association with the formation of the groove or the pit sequence is not formed on the semi-transparent recording film 41. In other words, even in the multi-layer recording medium 40, the position guide is formed at the only one layer position as the reference surface Ref.

In the multi-layer-shaped recording layer included in the multi-layer recording medium 40, since the semi-transparent recording film 41 functioning as a reflective film is formed, there is an advantage in that it is possible to perform the focus servo control using the reflected light from the semi-transparent recording film 41 during the recording period.

In addition, in the description hereinbefore, the reference surface Ref disposed on the bulk type optical disc recording medium or the multi-layer recording medium illustrated in FIG. 12 is disposed on the upper portion of the recording layer as the bulk layer 5 or the multi-layer structure recording layer. However, the reference surface Ref may also be disposed on the lower portion of the recording layer.

In addition, with respect to the reference surface Ref, the case where the guiding groove such as the groove or the pit sequence is formed as the position guide is exemplified. However, the position guide may also be formed by a different method, for example, mark sequence recording, or the like.

In addition, in the description hereinbefore, the case where the recording apparatus of the present disclosure is adapted to a recording-only apparatus which does not have a function of reproducing information recorded by the mark is exemplified. However, the recording apparatus of the present disclosure may also be very appropriately adapted to a recording/reproducing apparatus which also has a reproducing function.

The present disclosure contains subject matter related to that disclosed in Japanese Priority Patent Application JP 2010-234657 filed in the Japan Patent Office on Oct. 19, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
   a light illuminating/receiving unit which is configured to cause an optical disc recording medium to be illuminated through a common object lens with recording light and ATS light for adjacent track servo and to receive reflected light of the ATS light from the optical disc recording medium;
   a rotation driving unit which drives the optical disc recording medium to be rotated;
   a tracking mechanism which drives the object lens in a tracking direction which is a direction parallel to a radial direction of the optical disc recording medium;
   a tracking error signal generation unit which generates a tracking error signal indicating an error of an illumination spot position of the ATS light with respect to a mark sequence recorded on the optical disc recording medium based on a light-receiving signal of the ATS light obtained by the light illuminating/receiving unit; and
   a tracking servo controller which performs tracking servo control on the object lens by driving the tracking mechanism based on the tracking error signal,
   wherein the tracking servo controller is configured to include:
   a servo calculation unit which performs servo calculation based on the tracking error signal in a feedback loop as a tracking servo loop; and
   a feed forward controller which calculates an estimated value of a control target value of the tracking servo control of the tracking servo controller based on an estimated value of the illumination spot position of the ATS light obtained by performing a first filter process emulating a transfer characteristic of the tracking mechanism on an output signal of the servo calculation unit and a value of distance between the illumination spot position of the recording light and the illumination spot position of the ATS light and which applies a control signal, which is generated by performing a second filter process on the estimated value so as to suppress a transfer characteristic gain of the tracking servo loop to be equal to or less than 0 dB (decibel) in the entire frequency band, to the tracking servo loop;
   wherein the feed forward controller includes a phase characteristic improving processing unit having at least a pre-reading memory unit which causes the estimated value of the illumination spot position of the recording light obtained by adding the value of distance between the illumination spot position of the recording light and the illumination spot position of the ATS light to the estimated value of the illumination spot position of the ATS light of an elapsed predetermined time to be storable and which sequentially reads the estimated values of an elapsed time of less than the time of one rotation of the optical disc recording medium among the stored estimated values, the phase characteristic improving processing unit generating a phase characteristic improving signal for suppressing the phase delay of the frequency-phase characteristic of the tracking servo loop when the second filter process is performed on the output of the phase characteristic improving processing unit; and
   wherein the feed forward controller is configured to perform the second filter process by using a value of the phase characteristic improving signal as an estimated value of the control target value.

2. The recording apparatus according to claim 1, wherein the phase characteristic improving processing unit has a phase characteristic improving filter unit which performs a third filter process on the output of the pre-reading memory unit, and the filter characteristic of the phase characteristic improving filter unit is set to a filter characteristic which becomes the inverse characteristic of the frequency-phase characteristic of the tracking servo loop in the case where the second filter process is performed without application of the phase characteristic improving processing unit.

3. The recording apparatus according to claim 2, wherein the tracking servo controller further includes:
   an estimated tracking error signal generation unit which generates an estimated tracking error signal which is obtained by estimating the tracking error signal based on the estimated value of the illumination spot position of the ATS light obtained by the first filter process of the feed forward controller and the output signal of the phase characteristic improving processing unit;
   a pseudo servo calculation unit which generates a pseudo servo calculation output signal by performing a fourth filter process emulating the transfer characteristic of the servo calculation unit on the estimated tracking error signal; and
   a combination unit which combines the pseudo servo calculation output signal and the output signal of the servo calculation unit in the tracking servo loop.

4. The recording apparatus according to claim 3, wherein the combination unit combines the output signal of the servo calculation unit and the pseudo servo calculation output signal with predetermined weighting factors.

5. The recording apparatus according to claim 4, wherein the combination unit performs weighting so that a sum of the weighting factors of the output signal of the servo calculation unit and the pseudo servo calculation output signal is one.

* * * * *